(12) United States Patent
Niemeyer et al.

(10) Patent No.: US 12,209,333 B2
(45) Date of Patent: Jan. 28, 2025

(54) DISPLAY AND OPERATING DEVICE FOR A TEXTILE MACHINE

(71) Applicant: Maschinenfabrik Rieter AG, Winterthur (CH)

(72) Inventors: Cornelius Niemeyer, Allensbach (DE); Max Schmitt, Zürich (CH)

(73) Assignee: Maschinenfabrik Rieter AG, Winterthur (CH)

( * ) Notice: Subject to any disclaimer, the term of this patent is extended or adjusted under 35 U.S.C. 154(b) by 972 days.

(21) Appl. No.: 17/281,308

(22) PCT Filed: Oct. 1, 2019

(86) PCT No.: PCT/IB2019/058342
§ 371 (c)(1),
(2) Date: Nov. 15, 2021

(87) PCT Pub. No.: WO2020/070642
PCT Pub. Date: Apr. 9, 2020

(65) Prior Publication Data
US 2022/0081807 A1     Mar. 17, 2022

(30) Foreign Application Priority Data
Oct. 2, 2018  (CH) .................................. 01199/18

(51) Int. Cl.
*G06F 3/0482*   (2013.01)
*D01H 13/32*   (2006.01)
*G05B 15/02*   (2006.01)

(52) U.S. Cl.
CPC ............. *D01H 13/32* (2013.01); *G05B 15/02* (2013.01); *G06F 3/0482* (2013.01)

(58) Field of Classification Search
CPC .... G06F 3/048–05; G05B 2219/45191–45196
See application file for complete search history.

(56) References Cited

U.S. PATENT DOCUMENTS 5,592,605 A * 1/1997 Asuma ................. G06F 3/0483
715/835
6,535,787 B1 * 3/2003 Inamasu .............. G05B 19/409
700/192
(Continued)

FOREIGN PATENT DOCUMENTS

CH            699 917 B1     5/2010
DE     10 2008 001665 A1    11/2009
(Continued)

OTHER PUBLICATIONS

PCT Search Report, Dec. 12, 2019.
(Continued)

*Primary Examiner* — Daniel Rodriguez
(74) *Attorney, Agent, or Firm* — Dority & Manning, P.A.

(57) ABSTRACT

A display and operating device for a textile machine includes a touchscreen that displays a first main operating mask and of a second main operating mask, both of which present a plurality of retrievable information masks and input masks for operating the textile machine. The first main operating mask includes a machine visualization field that displays a simplified visualization of the textile machine and at least one shortcut operating button related to an operational task to be carried out by an operator on the textile machine. The first main operating mask also includes a first toggle button for accessing and presenting the second main operating mask. The second main operating mask includes a display of an overview of selectable submenus by means of which machine settings of the textile machine are set or changed, and additional information is retrievable.

25 Claims, 16 Drawing Sheets

(56) References Cited

U.S. PATENT DOCUMENTS

| | | | | |
|---|---|---|---|---|
| 7,590,942 | B2* | 9/2009 | Phillips | G06Q 10/06316 |
| | | | | 705/7.26 |
| 8,892,244 | B1* | 11/2014 | Taylor | F41H 5/0492 |
| | | | | 700/218 |
| 9,195,225 | B1* | 11/2015 | Eich | G06F 3/04847 |
| 2004/0083011 | A1* | 4/2004 | Ganz | G05B 19/045 |
| | | | | 700/20 |
| 2006/0143493 | A1* | 6/2006 | Meis | H04L 43/0823 |
| | | | | 714/47.1 |
| 2007/0113199 | A1* | 5/2007 | Lausterer | G05B 19/106 |
| | | | | 715/810 |
| 2008/0289552 | A1* | 11/2008 | Kawaguchi | D05B 3/02 |
| | | | | 112/445 |
| 2013/0174066 | A1 | 7/2013 | Felix | |
| 2013/0232442 | A1* | 9/2013 | Groth | G06F 3/048 |
| | | | | 715/783 |
| 2013/0311954 | A1* | 11/2013 | Minkkinen | G06F 3/04812 |
| | | | | 715/862 |
| 2015/0086667 | A1 | 3/2015 | Grimm | |
| 2016/0110087 | A1* | 4/2016 | Eich | G05B 19/0426 |
| | | | | 715/773 |
| 2019/0003089 | A1* | 1/2019 | Barea | D04B 15/99 |
| 2019/0136428 | A1* | 5/2019 | Son | D05B 19/085 |

FOREIGN PATENT DOCUMENTS

| | | |
|---|---|---|
| DE | 10 2011 113301 A1 | 3/2013 |
| EP | 0 511 941 A1 | 11/1992 |
| EP | 1 186 977 A2 | 3/2002 |
| EP | 1 460 499 A1 | 9/2004 |
| EP | 1 717 361 A2 | 11/2006 |
| EP | 2 392 705 A1 | 12/2011 |
| EP | 2 869 149 A1 | 5/2015 |
| EP | 3 165 976 A1 | 5/2017 |
| WO | WO 2012/127409 A1 | 9/2012 |

OTHER PUBLICATIONS

Karlmayer_if_design_award_2015, YouTube, Mar. 7, 2016, (YouTube Video Web Link), https://www.youtube.com/watch?v=rLUIHhQ&feature=youtu.be.

Swiss Patent Office Search Report, Nov. 13, 2018.

* cited by examiner

| Send Recipe to Machine | | | |
|---|---|---|---|
| Send "Cotton 32" to the machine? This will change the following parameters: | | | |
| | Curent Value | Recipe Value | |
| Nips | 440 → | 450 | 1/N |
| Batt Tension | 10.9 → | 10.2 | % |
| Batt Weight | 72 → | 76 | ktex |
| ✗ Cancel | | ✓ Send Recipe | |

| Manual Adjustments | |
|---|---|
| Please confirm that all the following manual changes have been made. | |
| ✓ Cange Mass "d" to 8.5 mm | ≡ Show Tutorial |
| ☐ Change top comb penetration to 1.0 | ≡ Show Tutorial |
| ☐ Cange main draft to 14.7 x | ≡ Show Tutorial |
| ✗ Cancel | ✓ Manual Changes Done |

DISPLAY AND OPERATING DEVICE FOR A TEXTILE MACHINE

FIELD OF THE INVENTION

The present invention is directed a display and operating device for a textile machine, to a textile machine comprising a display and operating device, and to a method for operating a display and operating device.

BACKGROUND OF THE INVENTION

A generic operating device for a textile machine is known from EP 1186977A2, for example, wherein a display screen is used to be able to display information masks and input masks for monitoring, control and operation of the machine. The choice of information masks and operating masks is made by a main operating mask which has a plurality of touch fields for selecting the information masks and input masks. To this extent, each mask supplied can be retrieved directly by a key command. In complex production plants, the problem that now arises is that the multiple information masks and input masks require a corresponding number of key fields, so a worker might be overwhelmed by the operation.

EP1460499A1 discloses an operating device for a machine tool which also has a sublevel containing additional options for display of information masks and input masks, in addition to a main operating level with a plurality of touchpads. The operating sublevel serves in particular to display information masks and input masks. Individual information masks and input masks from the main operating level as well as from the operating sublevel can be displayed. Therefore, an operator must take into account a wide variety of key sequences and key combinations. Here again, it may become a problem that a worker having had only simple training might be overburdened by operation of this machine.

EP2869149A1 discloses an operating device for a textile machine, on which various information is displayed in the different fields in such a way that access rights for screens and levels can be allocated. Particularly with larger and/or complex textile machines, such displays can quickly become confusing, which makes operation by an operator more difficult. This can result in incorrect manipulations or slower operation.

DE102011113301A1 relates to an operating device for a machine or a production plant. The operating device has a touchscreen for display of a main operating mask, which can be used to retrieve a plurality of information masks and/or input masks for control or operation of the plant and/or the machine, one after the other, on the touchscreen. To enable simple and targeted operation, the main operating mask has only one icon for a basic touchpad, such that a main operating level for selecting the information masks and/or input masks can be generated by operating this icon. The operator therefore can already see at the beginning that a sequence of keypads will have to be actuated.

It is proposed in DE102008001665A1 that a textile machine be equipped with a central machine control unit comprising a memory-programmable computer, on which it is possible to install a basic application program that can be retrieved for control and/or monitoring of a basic functionality of the textile machine, wherein a user interface is assigned to the computer and includes a display screen on which a graphical user interface can be displayed for input of operating commands for control of the textile machine and/or for output of information pertaining to the production sequence of the textile machine, and wherein the graphical user interface comprises a basic application field that can be generated by the basic application program using predefined display elements and/or display routines.

SUMMARY OF THE INVENTION

In this disclosure, unless otherwise specified and/or unless the particular context clearly dictates otherwise, the terms "a" or "an" mean at least one, and the term "the" means the at least one.

Additional objects and advantages of the invention will be set forth in part in the following description, or may be obvious from the description, or may be learned through practice of the invention.

In order to solve at least one of the aforementioned problems, a display and operating device for a textile machine according to the present invention typically comprises a touchscreen for display of a first main operating mask and of a second main operating mask, by means of which a plurality of information masks and/or input masks for operating of the textile machine can be retrieved. The first main operating mask comprises a machine visualization field, which displays a simplified visualization of the textile machine, and the machine visualization field further displays at least one shortcut operating button for an operating work that must be carried out by an operator on the textile machine. The first main operating mask further comprises a first toggle button by actuation of which the second operating mask can be reached. The second main operating mask comprises a display of an overview of submenus that can be selected respectively, and by means of which machine settings of the textile machine can be set and/or be changed and/or more information can be retrieved.

A display and operating device according to the present invention may also be used for multiple textile machines. Hence, according to a variation of the invention, the machine visualization field may also display a simplified visualization of multiple textile machines, such as e.g. two textile machines which process a textile semi-product or end-product in parallel (such as two cards working in parallel to each other) or in sequence (such as a combing machine providing a combed fiber strand to a sequentially arranged drawframe).

A simplified visualization of the textile machine may also be a depiction of only one part or of multiple parts of a textile machine. As such e.g. the simplified visualization may e.g. be a simplified broken view of a ring spinning machine consisting of the machine head (with the drive) and one spindle position. Thus, the parts on which most operating work has to be performed can be clearly displayed, making user interaction easier. In most cases multiple shortcut operating buttons will be present in order to initiate the most frequently used operating works.

With a display and operating device according to the present invention it becomes possible that an operator is visually provided with the most important information regarding current status and/or operation of a textile machine in an exceptionally clear manner as well as the most common activities to be initiated by an operator (operating work) through the machine control system (e.g. can exchange on a drawframe, initiation of doffing process on a ring spinning machine, detaching and/or piecing up on a combing machine) can be triggered directly via short access buttons/keys which are arranged in the machine visualization field of the first operating mask in an intuitive manner.

This simplifies monitoring of the operation of a corresponding textile machine. As well, an operator has to spend less time operating the textile machine from a terminal equipped with a display and operating device according to the present invention, as the most frequently required information is clearly visible at a glance and the most frequently used functions can also be recognized at a glance and called up directly. Hence, via a display and operating device according to the present invention the human-machine interaction becomes more efficient. On the one hand, this makes operation more efficient and on the other hand, operating errors can be reduced, which increases the overall efficiency of a textile machine equipped with the subject matter of the present invention.

As the operating works which most frequently have to be performed by an operator can be directly selected/initiated by means of the shortcut operating buttons which are displayed in the first main operating mask. These works are typically such that it can be done by all types of operators having different level of skills, respectively permissions, such as a normal shift workers as well as shift supervisors and technical supervisors or service technicians. Hence, one object of the invention can also be seen to improve upon a display and operating device for a textile machine of the generic type, such that various operating possibilities can be offered to operators having various levels of training. Another object of the invention may be regarded as to simplify operation of the textile machine and to offer a simplified user experience.

By using the second main operating mask, information that is not required continuously (or at least not particularly frequently) can be moved to the second main operating mask, thus cleaning up the first main operating mask and making a simplified visualization of the textile machine in combination with the shortcut operating button(s) possible. The same holds true for routines (operations) that are not particularly frequently used.

According to one variation of the present invention, the display and operating device for at least one textile machine has a touchscreen for display of at least one main operating mask, by means of which a plurality of information masks and/or input masks can be retrieved for operation of the textile machine, said display and operating device, wherein the first main operating mask comprises a machine visualization field, which displays a simplified visualization of the textile machine and shortcut access buttons for operating jobs that must be carried out by a worker on the textile machine; and wherein a second main operating mask, which displays an overview of additional submenus, each of which can be selected and can be changed by the machine settings of the textile machine and more extensive information can be retrieved, wherein the second main operating mask can be reached by operation of a button that is emphasized by its color on the first main operating mask, wherein only users having the required rights can make changes in the machine settings.

In a variation of the present invention, the first main operating mask comprises a first header that displays information and functions and wherein the second operating mask comprises a second header that displays information and functions. In a header functions of operation of the textile machine or of the display and operating device may be displayed.

A particularly user-friendly embodiment of the invention may be obtained if the second header displays at least the same information and functions as the first header. However, the second header may include additional information and functions. This provides a user with familiar visual and functional corner points on the second main operating mask, which simplifies operation.

According to one variation of the present invention, the first header of the first main operating mask is based on a first color scheme (e.g. comprising different shades of green) for the visualization of e.g. characters, numbers and graphical elements, whereas the second header of the second main operating mask is based on a second color scheme (e.g. different shades of blue or red) that differs from the first color scheme. This makes it easier for an operator to recognize whether he is operating the first or second main operating mask.

According to one variation of the present invention, the content and/or layout of the first and the second main operating masks are customizable. As such, they e.g. may be set in a special settings menu which can only be accessed by a user with a specific authorization (e.g. by logging one via entering a user name and/or password and/or by using an RFID-chip, NFC-device or similar).

Alternatively or in addition, the content and/or layout of the first and the second main operating masks may be dependent on the recipe currently being processed on the textile machine. As for different recipes also different types of operating work may have to be most frequently applied, in particular the types of shortcut operating buttons displayed may be dependent on the recipe. Hence, according to one variation of the present invention at least one shortcut operating button displayed may be automatically chosen depending on the recipe processed on the textile machine.

A particularly user-friendly variation can be obtained if the first toggle button is arranged in the first header. Alternatively or in addition, the first toggle button may be optically highlighted in comparison to the rest of the first main operating mask. Optical highlighting may e.g. be done by color, by means of shading or by means of an animation of the button. This allows a user to locate and identify the first toggle button more quickly, allowing the second main operating mask to be reached more quickly. Hence, the simplified and therefore more user-friendly layout of the first main operating mask does not lead to a noticeable reduction in accessibility of the submenus displayed on the second main operating mask.

According to one variation of the present invention the display and operating device is configured such that only one of the first and the second operating mask is displayed at the same time. The risk of operating errors can thus be reduced.

According to one variation of invention, the second main operating mask comprises a second toggle button by actuation of which the first operating mask can be reached. Also the second toggle button may be optically highlighted in comparison to the rest of the first main operating mask as described above in connection with the first toggle button. A particularly user friendly display and operating device may be obtained if the second operating mask comprises a second header that displays information and functions and wherein the second toggle button is arranged in the second header. Hence, this allows a user to switch back and forth at a constant and familiar location between the first and second main operating masks.

The first main operating mask advantageously comprises a first header, a notification field and a field for display of the characteristic data of the machine, wherein a classification of the characteristic values can be supported visually (e.g., through colors and various symbols).

According to a variation of the invention the at least one shortcut operating button for an operating work that must be carried out by an operator on the textile machine is arranged in the machine visualization field in such a way that it is locally associated with that part of the simplified visualization of the textile machine or machine part representing that part which is affected by the actual operating work. For example it may be arranged directly on the visualization (superimposed or overlapping it) and/or it may be arranged adjacent to it and/or it may be arranged in some distance but e.g. visually interconnected with the machine (or part of the machine) by a connecting line.

A particularly user-friendly display and operating device may be obtained if the first main operating mask comprises a notification field for displaying notifications and/or a display field for displaying characteristic data of the textile machine. A particularly well-arranged display and thus a highly user-friendly embodiment of the invention can be achieved if the notification field is arranged as a notification bar below and adjacent to a first header of a first operating mask as described herein.

In a variation of the present invention, after actuation of the shortcut operating button further instructions for an operator are displayed on the first main operating mask. The instruction may be superimposed. According to one variation of the invention also further information may be displayed together with the further instructions.

After actuation of the shortcut access buttons, more extensive instructions for the operator are advantageously displayed on the main operating mask.

Shortcut access buttons for one or more of the following jobs can advantageously be provided:
handling of materials;
shortcut access to functions;
simple problem solving; and
simple cleaning of the machine;
frequently repeated operating jobs on the machine (e.g., ejecting a can, preparing material . . . );
setting, starting and/or stopping production orders.

According to one variation of the present invention at least one shortcut operating for operating works that must be carried out by a worker on the textile machine is provided for access to one or more of handling material(s); shortcut access to functions; simple problem solving; simple cleaning of the machine; frequently repeated operating jobs on the machine; setting, starting or stopping production orders.

In the event of a malfunction or disturbance in the textile machine, a corresponding report and the site of the problem may be displayed, and additional details may be displayed by clicking on the report, e.g., alarm, warning, information message may advantageously be displayed and presented on the simplified visualization of the textile machine.

According to a variation of the invention in the event of a disturbance in the textile machine, a corresponding message is displayed on the first main operating mask, and the location of the disturbance is displayed on the simplified visualization of the textile machine. Good results may be obtained if the location of the disturbance is indicated by e.g. a specific graphical symbol representing an error, such as e.g. a red cross and/or a triangle and/or a red exclamation mark. This speeds up troubleshooting by the operator and increases the efficiency of the textile machine.

The second main operating mask advantageously may comprise an overview of additional submenus pertaining to
machine settings;
quality-based information and settings;
data analysis for ongoing production;
notifications;
recipes;
service;
maintenance;
general settings;
user manual;
information & logs;
backup; and
data transmission.

According to one variation of the present invention the second main operating mask comprises an overview of submenus relating to one or more of settings of the machine; quality-based information and settings; data analysis of ongoing production; notifications; recipes; services; maintenance; general settings; user manual; information & logs; backup; data transfer.

The second main operating mask advantageously includes a second header and/or a navigation field. This allows a faster operation of the second main operating mask and also to increase operation safety if the second header shows some operational data which consequently becomes visible during the whole user interaction. Particularly good results may be obtained if the second header of the second main operating mask is essentially identical with that of the first main operating mask. Thus, operation becomes more user-friendly as the operator is confronted with the same type of layout which consequently decreases incorrect manipulation as well as it increases manipulation speed.

The user can advantageously log onto the first or second main operating mask with a username and password. Thus, operation safety of a textile machine can be increased as it can be ensured that only users having a certain level of competence have access to the second main operating mask. At the same time, such logging information may be used in order to log/protocol operation.

Particularly good results may be obtained if a user can log on with a username and password on the first and/or the second main operating mask. In other words the first and/or the second main operating mask may provide means that allow a user to log on to prove his identity or authorization to retrieve certain information or to make certain changes to the display and operating device or to the textile machine. A display and operating device having a particularly intuitive and therefore user-friendly user interface may be achieved, if the first main operating mask comprises a first authentication button and/or the second main operating mask comprises a second authentication button by means of which a user can reach an input mask to enter login details (e.g. user name and password). A particularly user-friendly user interface may be obtained if a first authentication button is arranged in a first header of the first main operating mask and/or a second authentication button is arranged in a second header of the second main operating mask. Particularly good results may be obtained if the first and/or second authentication button has a first design (appearance) when no user is logged on and a second design when a user is logged on, the second design being visually distinct from the first design. Alternatively or in addition, also the design of a first and/or second header may change from a first header design to a second header design when a user logs in, and vice versa.

A confirmation message advantageously appears as an overlay over the second main operating mask after the settings have been changed. This prevents unwanted changes (e.g. due to operating errors) from going unnoticed by the operator.

In other words, according to a variation of the present invention a display and operating device may include means for displaying a confirmation message as an overlay over the second main operating mask after machine settings have been set and/or changed.

The first and/or second main operating mask and the entire visualization are advantageously based on web technology (e.g., HTML5). Thus, interoperability between different platforms can be increased.

The textile machine is advantageously a spinning mill preparation machine or a final spinning machine.

The display and operating device is advantageously mobile or mounted on the textile machine or is a stationary display device on which information is displayed in a web browser.

The invention is further directed to a textile machine comprising an embodiment of a display and operating device as described above.

The invention also relates to a system having a display according to the invention, and operating device wherein the display and operating device is suitable for operation of a plurality of textile machines. Good results may be obtained if the system is a control system for a textile machine.

The present invention is also directed to a method for operating a display and operating device as described herein, having the method steps of displaying a first main operating mask having a simplified visualization of a textile machine and at least one shortcut operating button for operating work that must be carried out by an operator on the textile machine and a first toggle button; and displaying a second operating mask when the first toggle button is actuated, to allow a user to change the machine settings of the textile machine and/or to allow retrieval of further information.

According to a variation of a method according to the present invention, the method comprises the method steps of:

a first operating mask is displayed with a simplified visualization of the textile machine and shortcut access buttons for manual jobs that must be carried out by a worker on the textile machine; and a second operating mask is displayed by means of which the machine settings of the textile machine which can be changed by a user, and by means of which more extensive information can be retrieved, wherein the second main operating mask can be reached by operating a button on the first main operating mask.

Advantageously a user is automatically logged off as soon as he leaves the second main operating mask and returns to the first main operating mask. Alternatively, after a fixed or configurable period of time of inactivity on the second main operating mask, the system returns to the first main operating mask and the user is logged off. Alternatively, it is possible to configure the system with regard to whether or not the system should automatically log the user out.

According to a variation of a method according to the present invention a second toggle button is displayed on the second operating mask by actuation of which displaying of the first operating mask can be initiated and wherein a user is logged off from a logged-on state as soon as the second toggle button is actuated.

A particular safe variation of a method according to the present invention may be obtained if when the second main operating mask is displayed and after a predetermined time of user inactivity on the second main operating mask, the first main operating mask is displayed and a user is logged off from a logged-on state. This reduces the risk of incorrect operation by unskilled employees.

The user is advantageously instructed to log in as soon as he attempts to make changes in the machine settings.

A further particular safe variation of a method according to the present invention may be obtained if when trying to make changes in the machine settings a user is asked to log on. This may e.g. be done by displaying a message, particularly in the second main operating mask.

BRIEF DESCRIPTION OF THE DRAWINGS

The herein described invention will be more fully understood from the detailed description of the given herein below and the accompanying drawings, which should not be considered as limiting to the invention described in the appended claims.

FIG. 14 shows a dialog for a user to log on;

FIG. 27 shows sending a recipe to the machine;

FIG. 28 shows instructions for manually changing a setting;

DETAILED DESCRIPTION OF THE INVENTION

Figure 1:
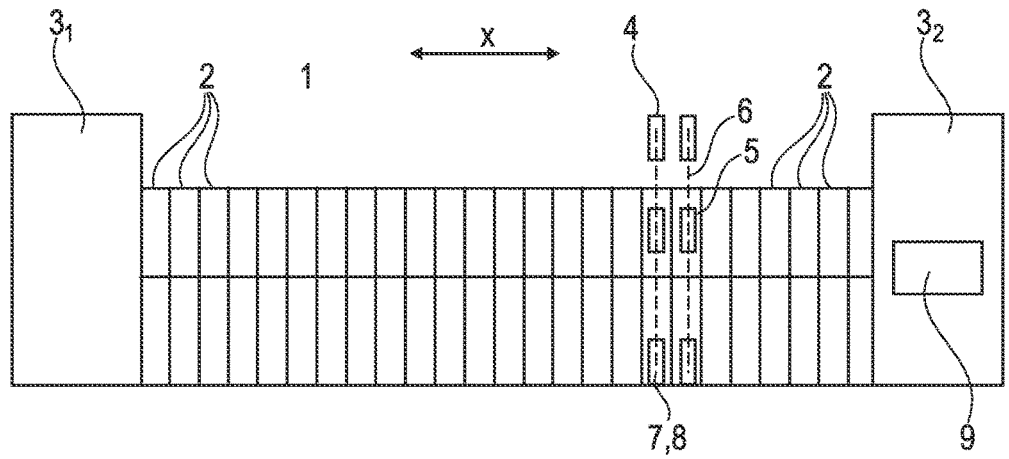
FIG. 1 shows schematically a ring spinning machine 1 having an operating device object according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

FIG. 1 shows schematically a ring spinning machine 1 which has a plurality of spinning positions 2 arranged side by side. The spinning positions 2 are situated in a longitudinal direction x of the ring spinning machine 1, arranged between a head $3_1$ and a foot $3_2$. Head $3_1$ and foot $3_2$ of the ring spinning machine 1 may include bearings, drives, controllers, etc. that are necessary for operation of the machine. As can be seen, for example, on two spinning positions 2 that are illustrated schematically in FIG. 1, each spinning position consists of a roving bobbin 4 which is arranged above a drawing device 5 and on which a roving 6 is wound. The roving 6 runs from the roving bobbin 4 over the drawing device 5 where it is drawn and is then guided to a yarn-forming element by means of a thread guide. A rotating ring winds the finished yarn onto a cop 7. The cop 7 is placed on a spindle 8. The ring spinning machine 1 has a display according to the invention and operating device 9 which is described in greater detail with reference to the following figures.

Ring spinning machines are mentioned only as an example; the operating device 9 according to the invention can be mounted on textile machines of spinning mill preparation machines in general, such as bale openers, drawing mills, carding machines, combing machines or final spinning machines, such as open-end air spinning machines, flyers, winders, etc. The display and operating device 9 may be mobile or mounted on the textile machine. It may also be suitable for operation of one or a plurality of textile machines. In addition, it may be a stationary display device in which information is displayed in a web browser.

Figure 2:
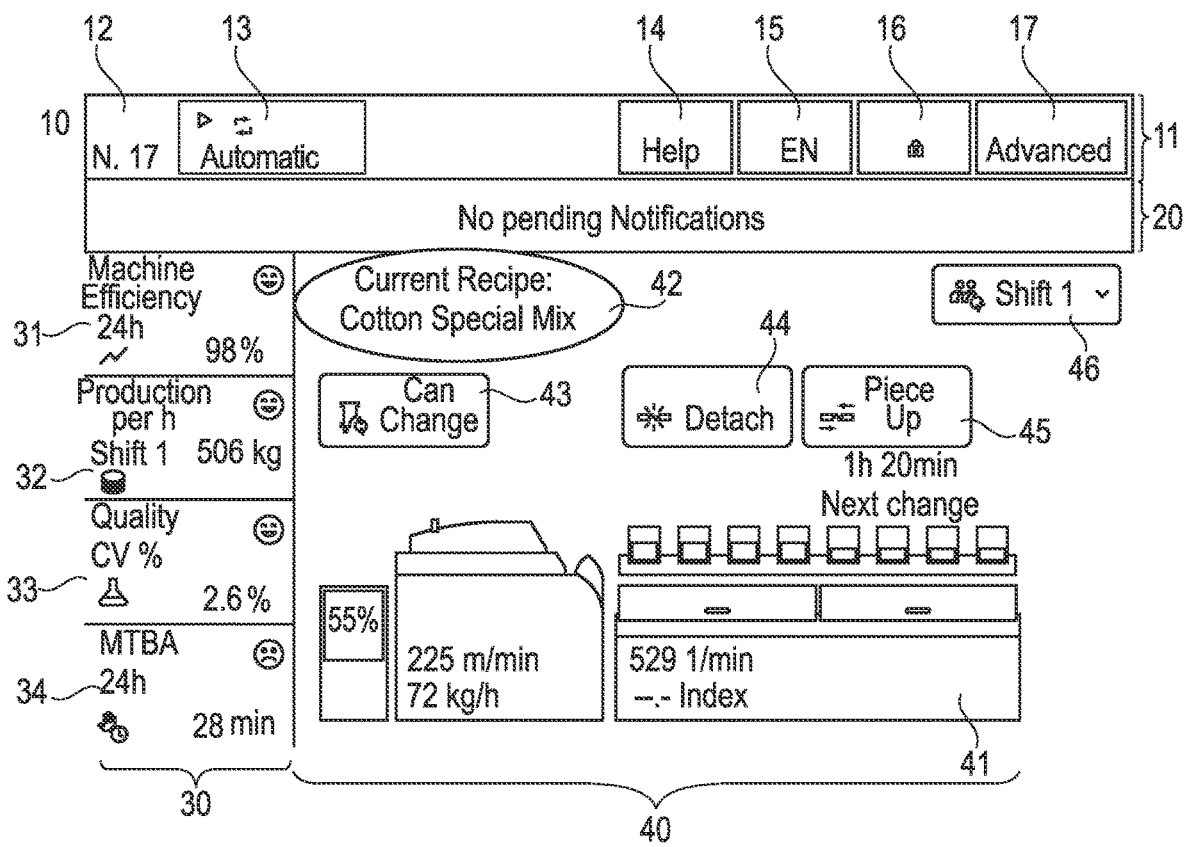
FIG. 2 shows a first main operating mask with instructions for operation.

FIG. 2 shows a first main operating mask 10 with simplified operating elements.

The first main operating mask 10 presents essential information and functions that are necessary for daily interaction with the machine to a less-trained worker. The first main operating mask 10 thus contains a very limited amount of information and interaction options and can also be called "simple mode." The worker's tasks include, for example, handling of material, shortcut access to functions, simple problem solving and simple cleaning of the machine.

Specifically, the first main operating mask 10 includes a header 11, a notification field 20, a display field 30 for the display of characteristic data of the machine and a machine visualization field 40.

The first header 11 contains
information 12 about the machine type, machine number and the current time;
the mode 13 which displays the operating status and mode of the machine (read only);
a help button 14 to retrieve a help page or an operating manual or to make a screenshot;
a button 15 for selecting the language;
a first authentication button 16 for logging on and logging off, to change user and to request information about the current user; and
a first toggle button 17 for switching to the second main operating mask.

The notification area 20 may include one of the following messages: alarm messages, warnings and display of information. Examples of these messages are illustrated in the following figures.

The display field 30 contains a display of the characteristic data of the machine. This field 30 is reserved for characteristic production numbers, i.e., for the current status of production (displays 31, 32, 33, 34). A classification of characteristic values can be supported visually, for example, with colors and various symbols such as smiley faces, etc. indicating whether the value is good, moderate or not good. Examples of such characteristic data include machine efficiency, productivity of a shift or per unit of time (e.g., hour) and the current quality status. More extensive information is displayed by clicking on a display (cf. FIG. 8).

Figure 4:
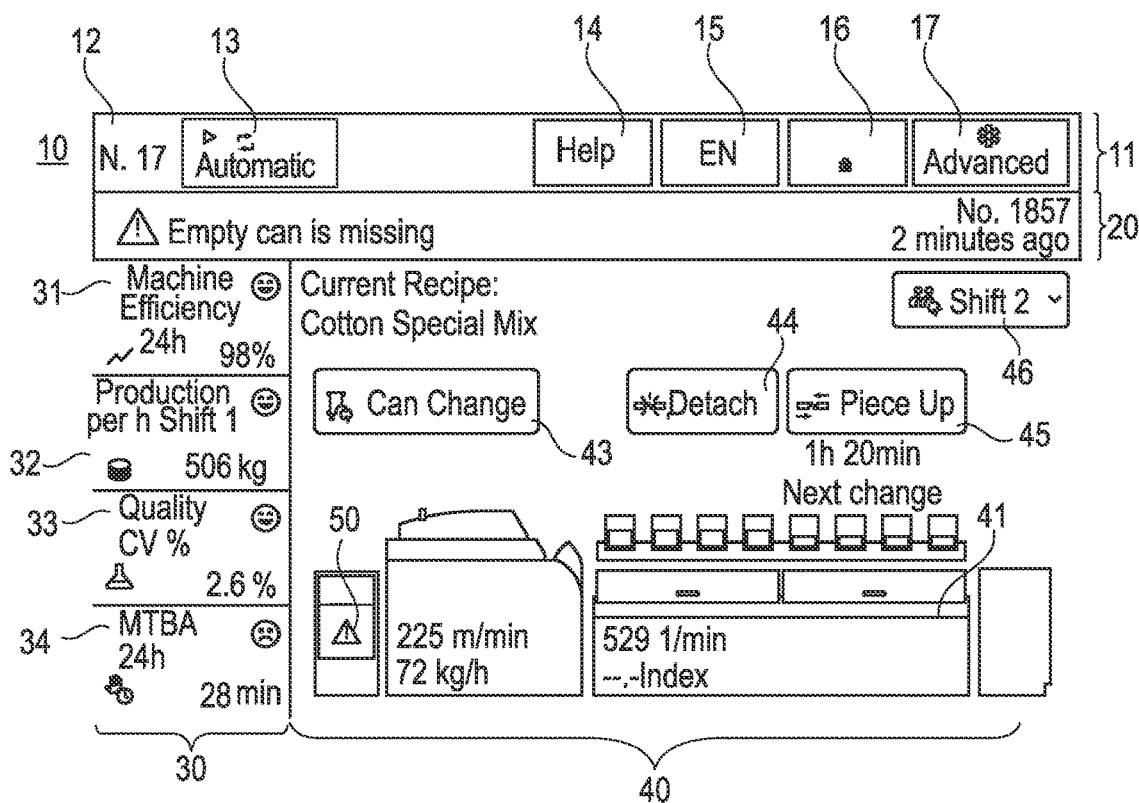
FIG. 4 shows a first main operating mask with a warning message.
Figure 6:
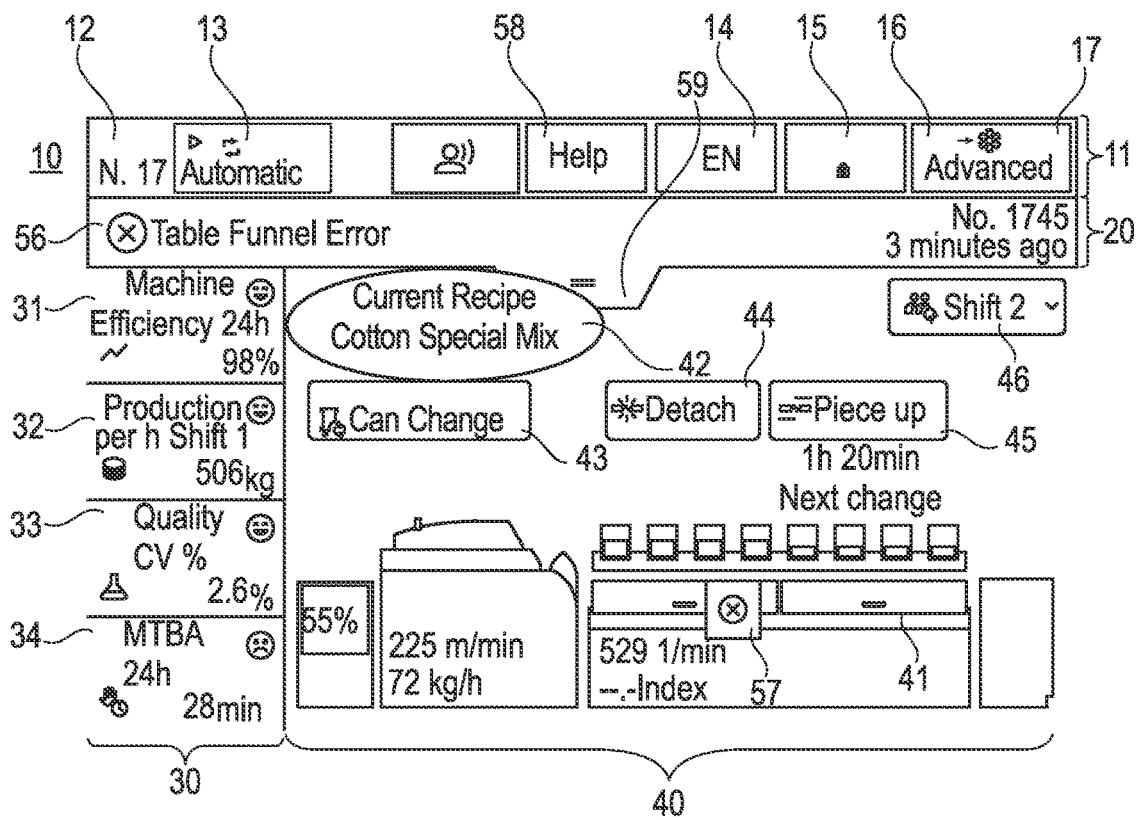
FIG. 6 shows the first main operating mask with an alarm message.

The machine visualization field 40 includes:
a visualization of the machine 41 with visual status information about materials and ongoing processes;
recipe display 42 with information and in particular names of the current recipe;
shortcut access buttons 43, 44, 45 for jobs that must be carried out frequently by the worker, for example:
handling of material(s);
shortcut access to functions;
simple problem solving;
simple cleaning of the machine;
often repeated operating jobs on the machine (e.g.: eject a can, prepare material . . . ); and
setting, starting and stopping production orders;
selecting a button 46, which determines which layer is allowed to be active; and
in the case of notifications, notification symbols that are displayed directly on the machine visualization (cf. FIGS. 4, 6).

The first main operating mask ("simple mode") is the screen of the display set as the standard, i.e., after a certain period of time (e.g., inactivity), this is displayed again and/or the machine returns to it.

Figure 3:
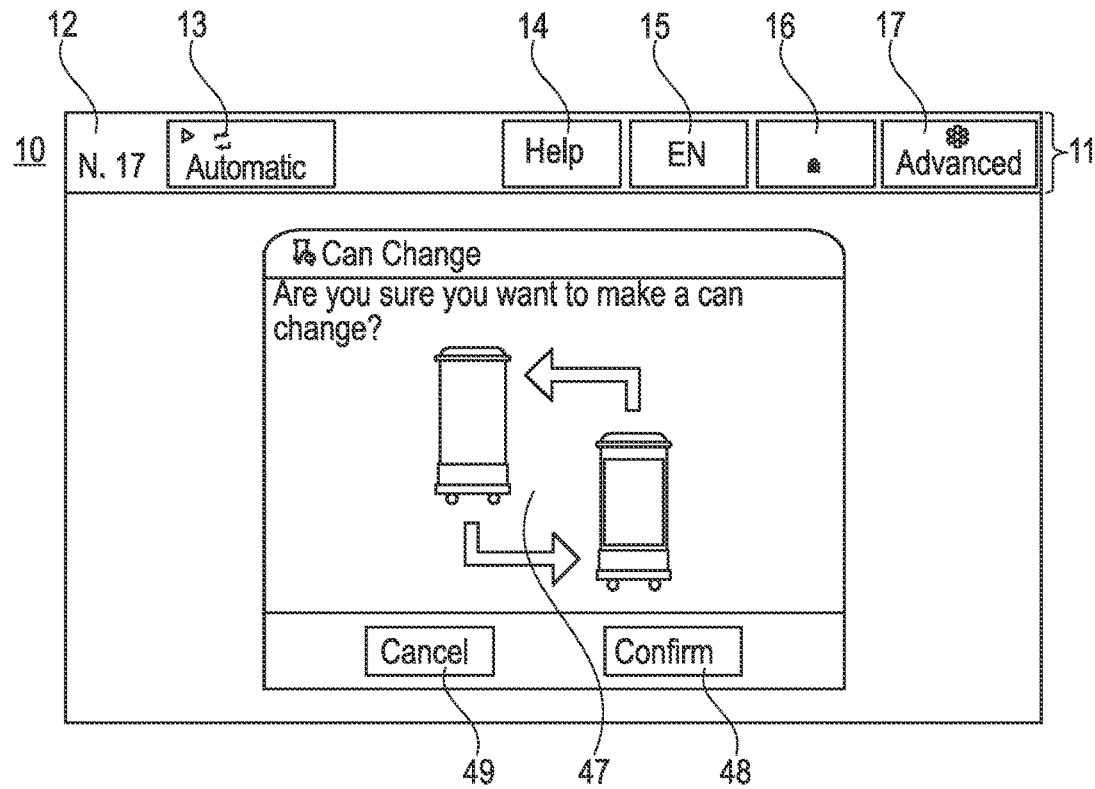
FIG. 3 shows a display with working instructions for confirming an action.

FIG. 3 shows a display 47 with an operating instruction for confirming an action. In this case, the display 47 is superimposed on the first main operating mask 10, so that in this condition, additional actions are possible again only when the display 47 is closed. Such a display 47 appears after clicking on one of the shortcut access buttons 43, 44, 45 in FIG. 2 and indicates the activity to be carried out. The activity (in this case, changing a can) is illustrated graphically and can be carried out accordingly. The worker has the option of confirming the activity by an operating button 48 or canceling it by operating button 49.

FIG. 4 shows the first main operating mask 10 with a warning message ("empty can is missing") in the notification field 20. The message, which can be highlighted in color, contains a number indicating when the message was displayed (e.g., two minutes ago). At the same time, a warning 50 (e.g., a colorless triangle) is displayed on the screen 41, showing where in the machine there are problems.

Figure 5:
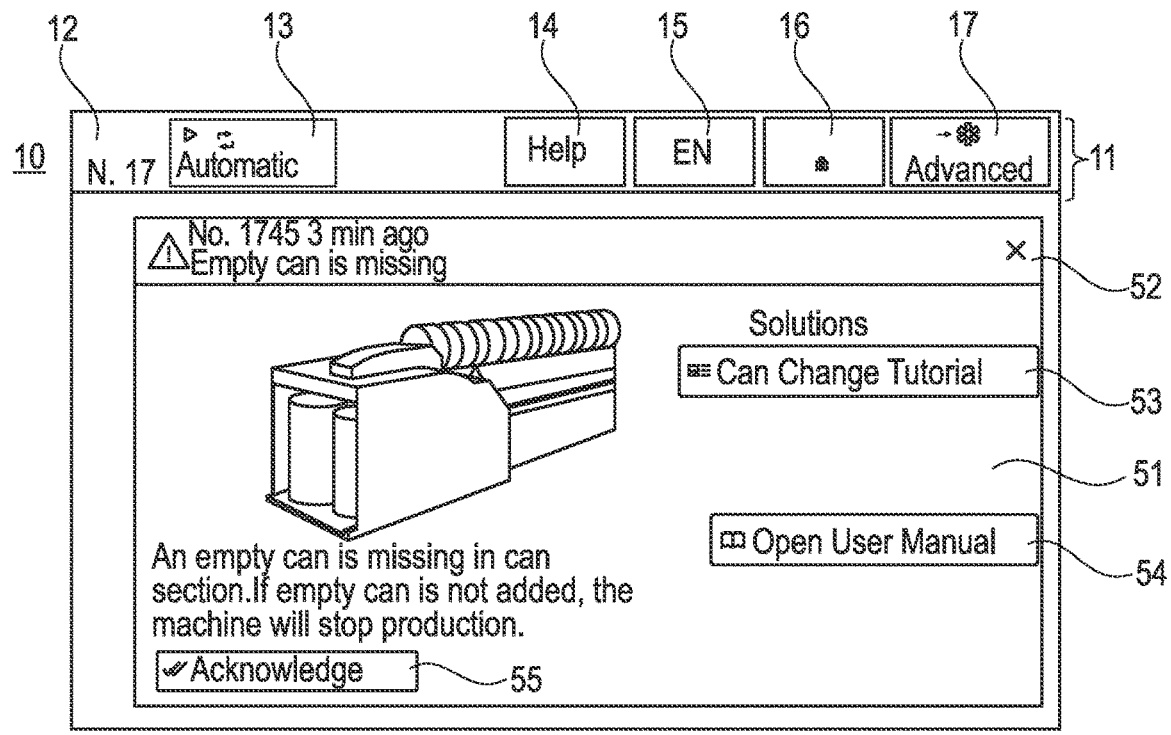
FIG. 5 shows the warning message opened according to FIG. 4.

FIG. 5 shows the open warning message according to FIG. 4. By clicking on the warning indication 50 on the display 41 or a corresponding message in the notification field 20, the display 51 appears again, superimposed on a main operating mask 10. In addition to the title row 52 of the display 51, with the title, message number and time, the problem is displayed graphically and described in short sentences. In addition, solutions are offered for opening operating instructions (operating button 54) or other instructions (operating button 53). An operating button 55 serves to close the display 51 and to return to the main operating mask 10.

FIG. 6 shows the first main operating mask 10 with an alarm message in the notification field 20. The alarm message contains a title 56 with a number (e.g., no. 1745) and there is an indication of when the message was displayed (e.g., three minutes ago), a button 58 for calling a service technician (in the header 11) and a button 59 for simplified display of all notifications (if there are multiple notifications). At the same time, a display 57 (e.g., a colored triangle with a cross) is shown on the display 41 indicating where there are problems in the machine.

Figure 7:
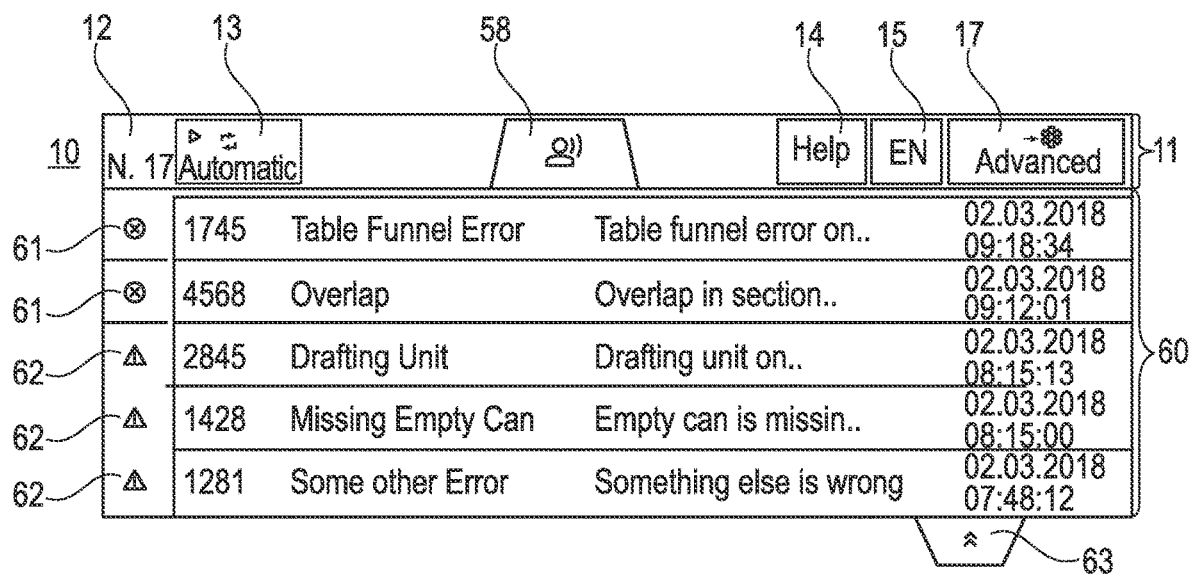
FIG. 7 shows the first main operating mask with a list of different messages.

FIG. 7 shows the first main operating mask 10 with a list 60 of various messages after the button 59 in FIG. 6 has been depressed. The display is again superimposed on the main operating mask 10. In the given example, two alarm messages 61 and three warnings 62 are displayed. A reset button 63 serves to depart the list 60 and return to the first main operating mask 10.

Figure 8:
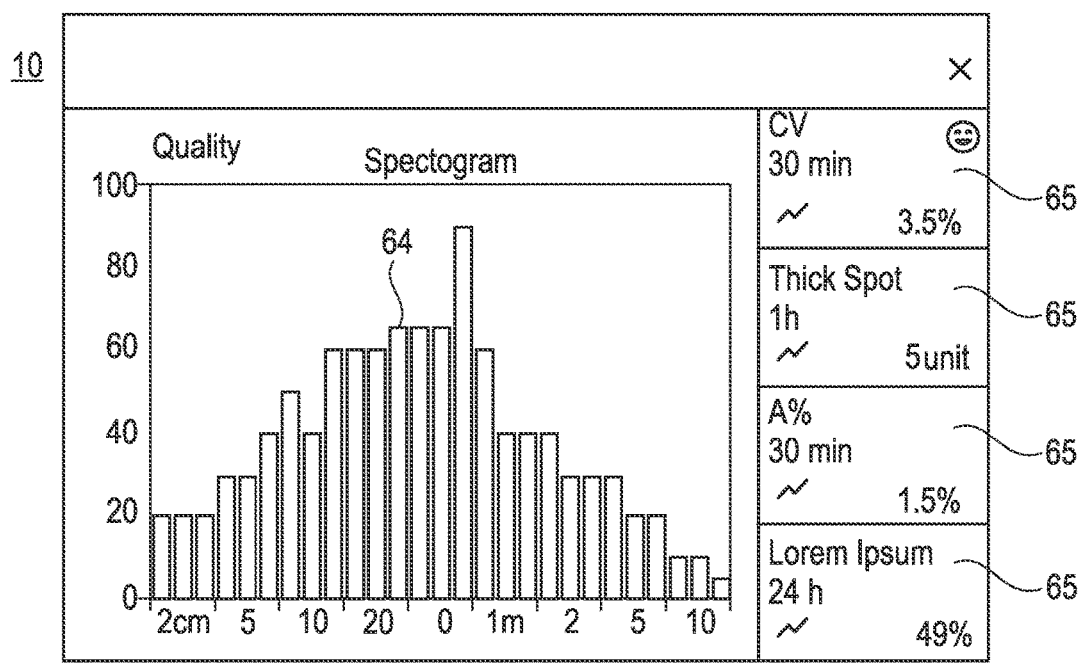
FIG. 8 shows a quality display for ongoing production that can be reached by means of the first main operating mask.

FIG. 8 shows a quality display 64 for ongoing production that can be reached via the first main operating mask 10 by depressing one of the buttons 31 to 34. In addition to a graphical display, the displays 65 additionally indicate a few characteristic numbers of the ongoing production.

Figure 9:
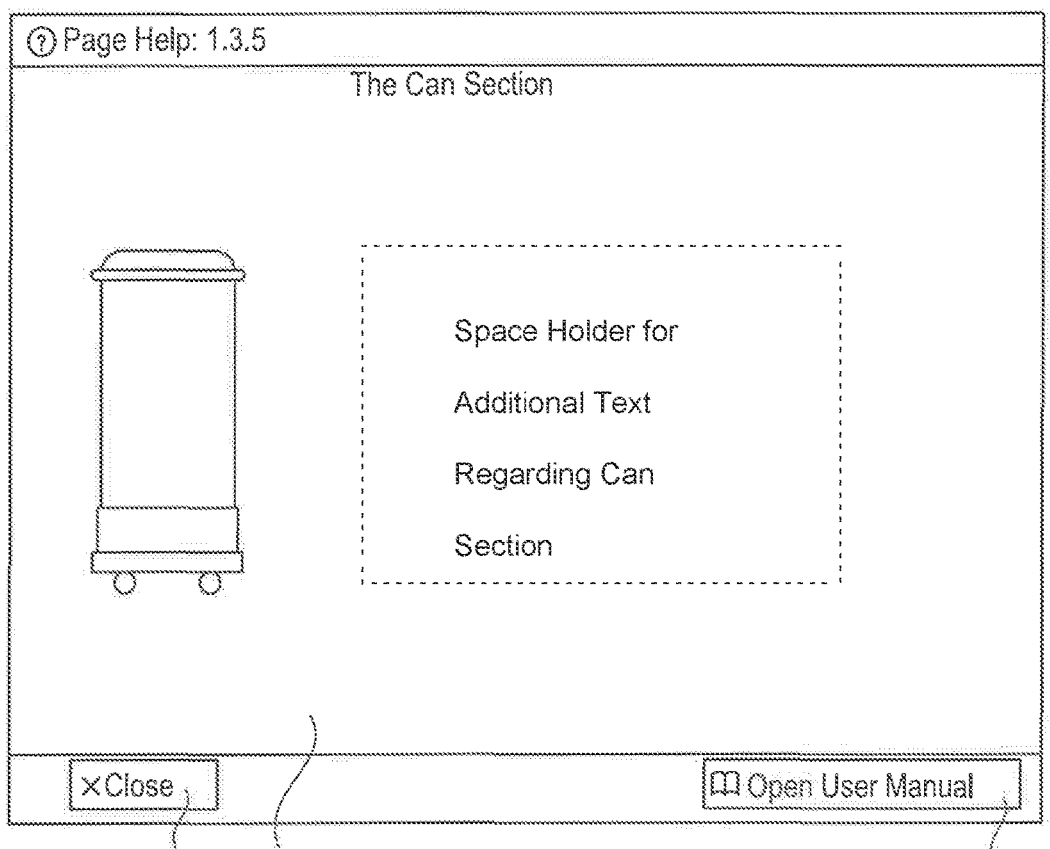
FIG. 9 shows a help page.

FIG. 9 shows a help page after depressing the help button 14. This is a display 66 with a description, an operating button 67 for opening the more extensive user manual and an operating button 68 for closing the display.

Figure 10:
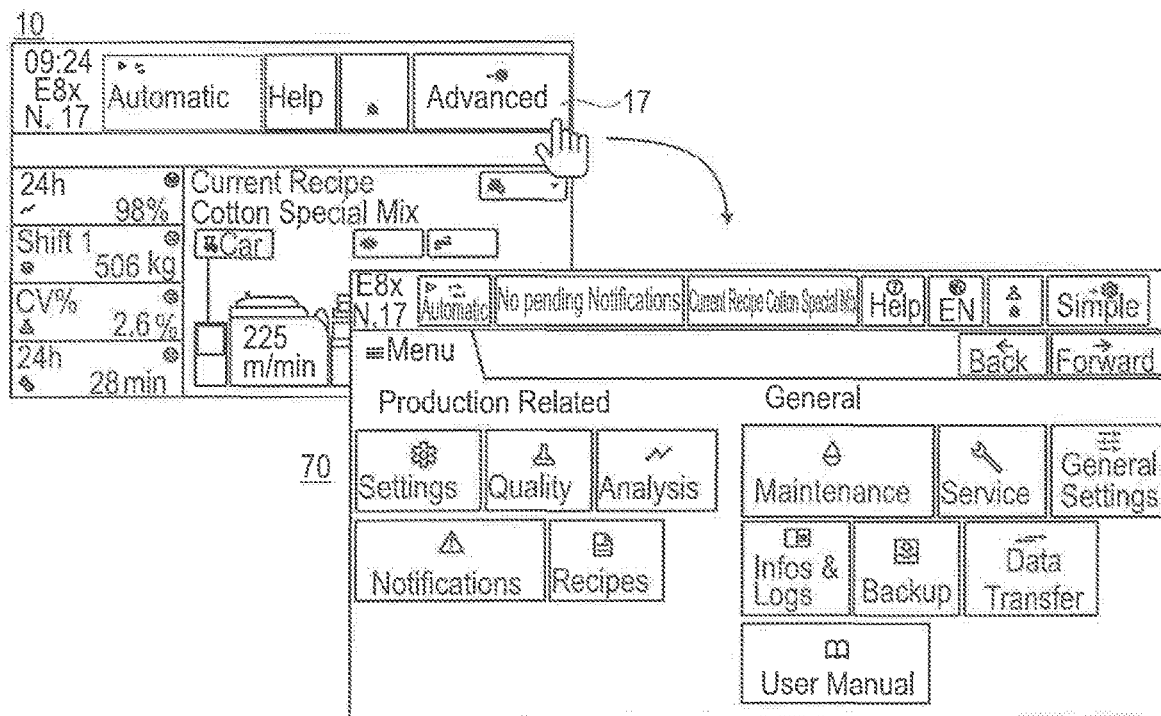
FIG. 10 shows the operation of switching from the first main operating mask to a second main operating mask.

FIG. 10 shows the switching operation from the first main operating mask 10 to a second main operating mask 70 by retrieving the first toggle button 17 for switching to the second main operating mask 70.

The switch from the first main operating mask 10 ("simple mode") to the second main operating mask 70 ("expanded mode") requires an automatic message. In the variation shown all users can switch between modes at any time. However, only users with the required rights can make changes in the machine setting. The device instructs the user automatically to log on if he would like to make a change (cf. FIG. 14). When the user leaves the second main operating mask 70 and returns back to the first main operating mask 10, users are automatically logged off after a certain period of time (adjustable). The device also returns automatically to the first main operating mask 10. The first and second main operating masks 10, 70 and the entire visualization are advantageously based on web technology (for example, HTML5).

Figure 11:
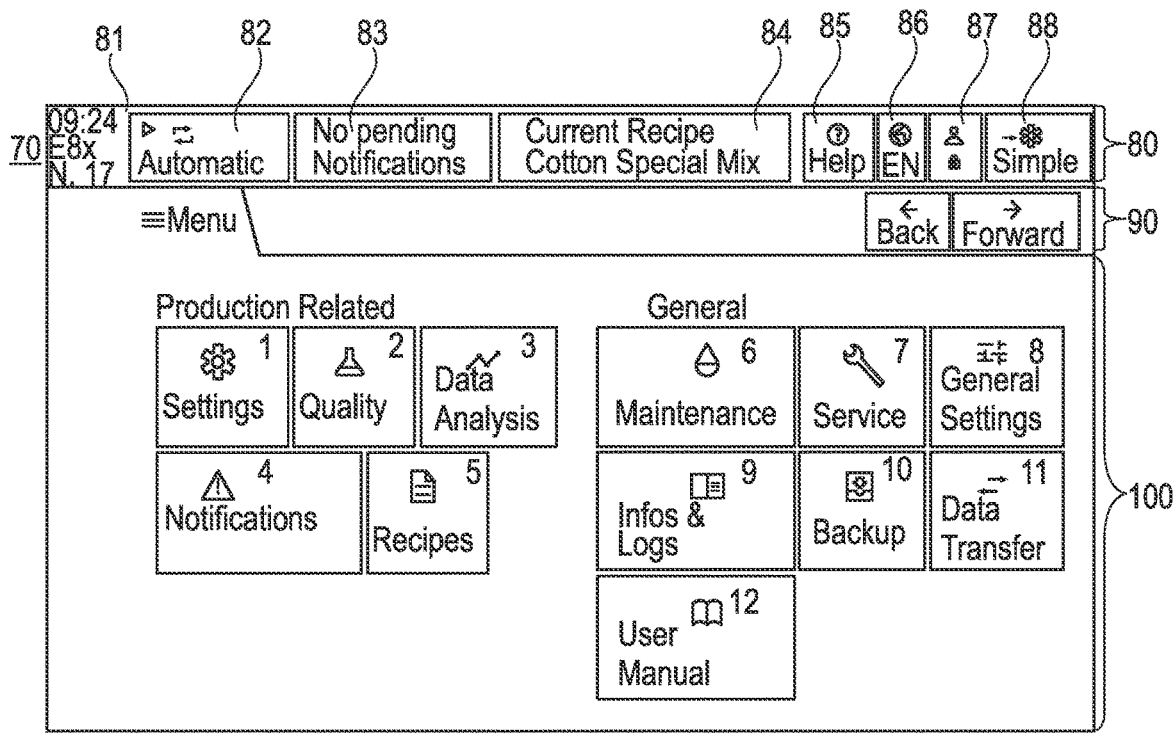
FIG. 11 shows the second main operating mask, by means of which the machine settings of the textile machine can be changed, and by means of which more extensive information can be retrieved.

FIG. 11 shows the second main operating mask 70 by means of which the textile machine can be operated and by means of which further information can be retrieved. The second main operating mask 70 is directed at an "expert," (e.g., production expert, person responsible for quality, service technician, etc.) and offers access to essentially the entire machine functionality and can also be referred to as "expanded mode." The tasks of the "expert" include, for example, changing the production settings, fine tuning, optimizing the machine, quality management, complex problem solving, troubleshooting, organization of the shift, support and software updates, etc.

The second main operating mask 70 shows a second header 80, a navigation field 90 embodied as a navigation bar and a menu overview 100. The second header 80 is always visible on the second main operating mask 70. It contains only information and functions which are necessary on any screen, for example:

- a machine selection 81 includes information about the type of machine, the machine number and the current time;
- a mode 82, which indicates the operating status and the mode of the machine. The mode ("manual," "automatic" and "service") can be changed here. By operating the button, a drop-down menu appears by means of which the settings can change;
- a notification button 83. The most important notifications are displayed and direct access to a notification list is given (cf. FIG. 23). The notifications may be in different colors.
- A recipe button 84. The button 84 indicates the current recipe. By operating the button, a down-drop menu appears by means of which the following settings can be changed:
  saving changes in a recipe;
  restoring a recipe;
  saving current machine settings as a new recipe;
  generating new recipes;
  retrieving the recipe list;
- a help button 85. The help button 85 is identical to button 15. It can retrieve:
  a help page which is situated above the main screen (cf. FIG. 9);
  operating manual;
  preparing a screenshot of the page;
- a button 86 for adjusting the languages;
- a second authentication button 87 for logging on and logging off, for switching users and for issuing queries about information about the current user;
- a second toggle button 88 for switching to the first main operating mask 10.

In the embodiment shown, the navigation filed 90 always shows the exact current location of the user in the application. It always contains at least the overview page of a main section, e.g., "settings." As soon as the user navigates within a section, the next navigation level is displayed and the higher level becomes "active," so that the user can return with a click to the higher level. The menu overview 100 can be retrieved directly on the left side and buttons for navigating forward and in reverse appear on the right side.

A menu overview 100 provides access to standardized applications:

Settings: access to all machine settings, structured according to machine modules or processes/tasks (e.g., "can," "drawing stand," "spinning machine," "combing machine," etc.). Expanded settings may be faded in or out depending on the user application level;

Quality: quality-based information and settings (for example, line, tolerance levels);
Data analysis: information and analysis of ongoing production and trends, structured according to themes (e.g., "efficiency," "energy"), with the possibility of reporting;
Notices: list of active notices and link to the notification course and to analysis;
Recipes: list of all stored recipes with management options (e.g., duplicating, deleting, etc.);
Service: starting operation/error elimination functions, for example, I/O tests, sensors, manual functions;
Maintenance: maintenance settings, outstanding tasks and history;
General settings: production-relevant settings and settings that are not directly associated with production. Transferable between machines:
  network settings;
  user management;
  shifting settings;
  display settings;
  units and measures;
  time and date;
  language and keyboard;
  software and licensing;
  simple mode settings;
  lamp configuration (if available for this device);
  horn configuration (if available for this system);
User manual: complete user manual with search options;
Information & logs: general information about the machine (for example, hours of operation) and detailed, filterable lists of all events recorded on the device;
Backup: various backup options;
Data transfer: all data transfer options to/from the device, with a list of possible data records that should be transmitted. Note: general machine information (e.g., machine number) must always be included in a transfer in order to clearly identify the data.

Figure 12:
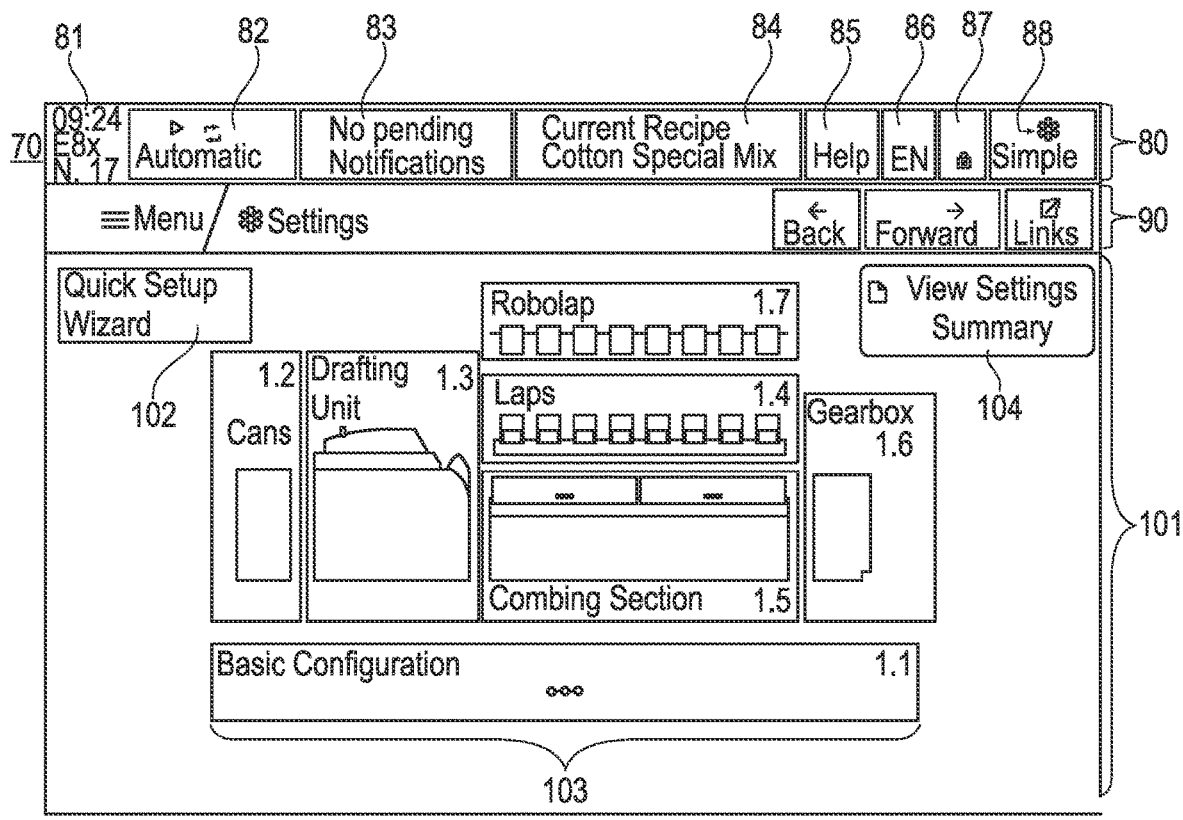
FIG. 12 shows an overview page for choosing machine selections, where settings that should be made can be reached by means of the second main operating mask.

FIG. 12 shows the page for changing settings on a textile machine which can be reached via the second main operating mask 70. The summary of settings 101 includes a quick setting wizard 102, a graphical display of the machine 103 and a button for the overview of settings 104. These elements can each be selected individually and lead to submenus.

Figure 13:
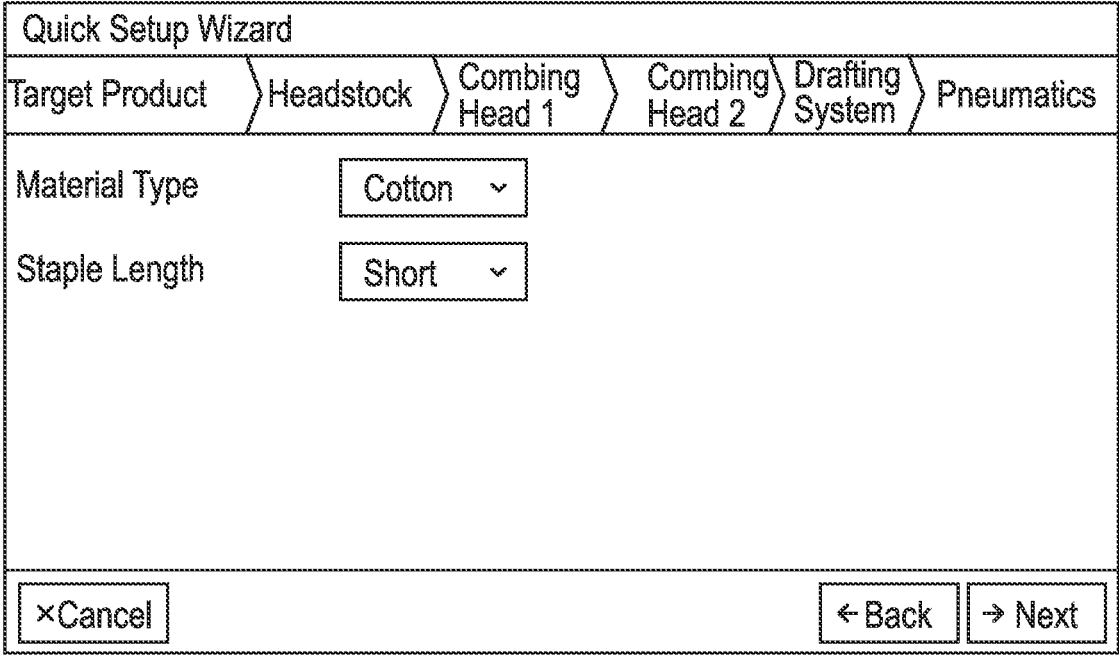
FIG. 13 shows shortcut access for settings that can be reached by means of the second main operating mask.

FIG. 13 shows the fast setting wizard for settings that can be reached via subpages of FIG. 12. The fast setting wizard 102 or an assistant is used to guide the user step by step through a process. He is instructed by a button regarding contents and placed over the content field. Wizards are modal, i.e., they can be closed only by termination or by any type of exclusion action (e.g., "send to machine"). Assistants can be used for data input or simple info/tutorial purposes. In the upper field there is a display showing where the user is and in the lower field the user can navigate forward and in reverse ("back," "next").

Figure 14:
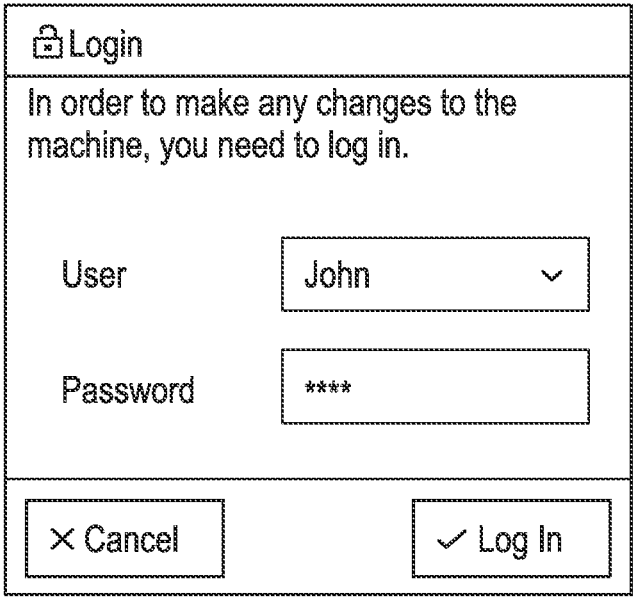

FIG. 14 shows a dialog for a user to log on. A corresponding log mask 105 asks the user for a username and password. The device automatically instructs the user to log on if he would like to make a change. It is also conceivable for the user to be logged onto the machine with an RFID tag.

The log out can take place by operation of a button in the header 80. If the user leaves the second main operating mask 70 and returns to the first main operating mask 10, the user is automatically logged off. After a certain period of (adjustable), the device also returns automatically to the first main operating mask 10. There are additional possibilities when the machine is restarted or when there is an interruption in the power supply.

Figure 15:
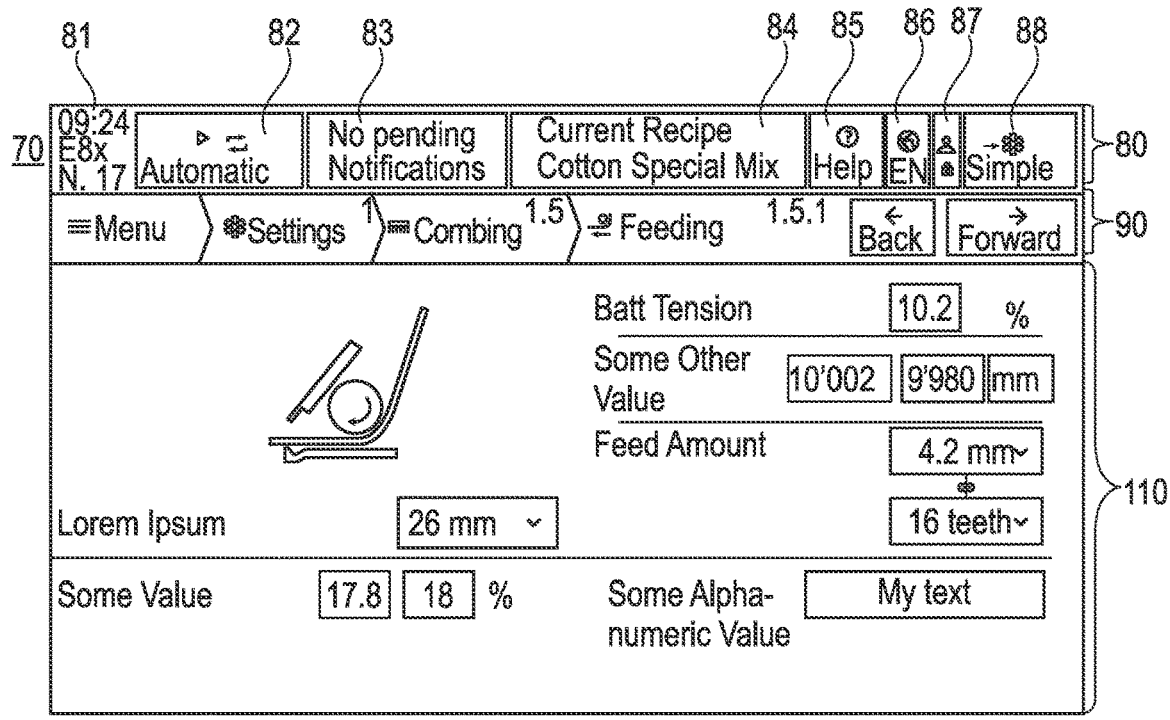
FIG. 15 shows a page for adjusting the parameters on the example of the combing machine.

FIG. 15 shows a page for setting the parameters on the example of the combine machine. The display 110 for settings contains, in addition to a graphical display, a field in which values can be changed. It is also possible for the user to see in the navigation bar 90 where the user is located.

Figure 16:
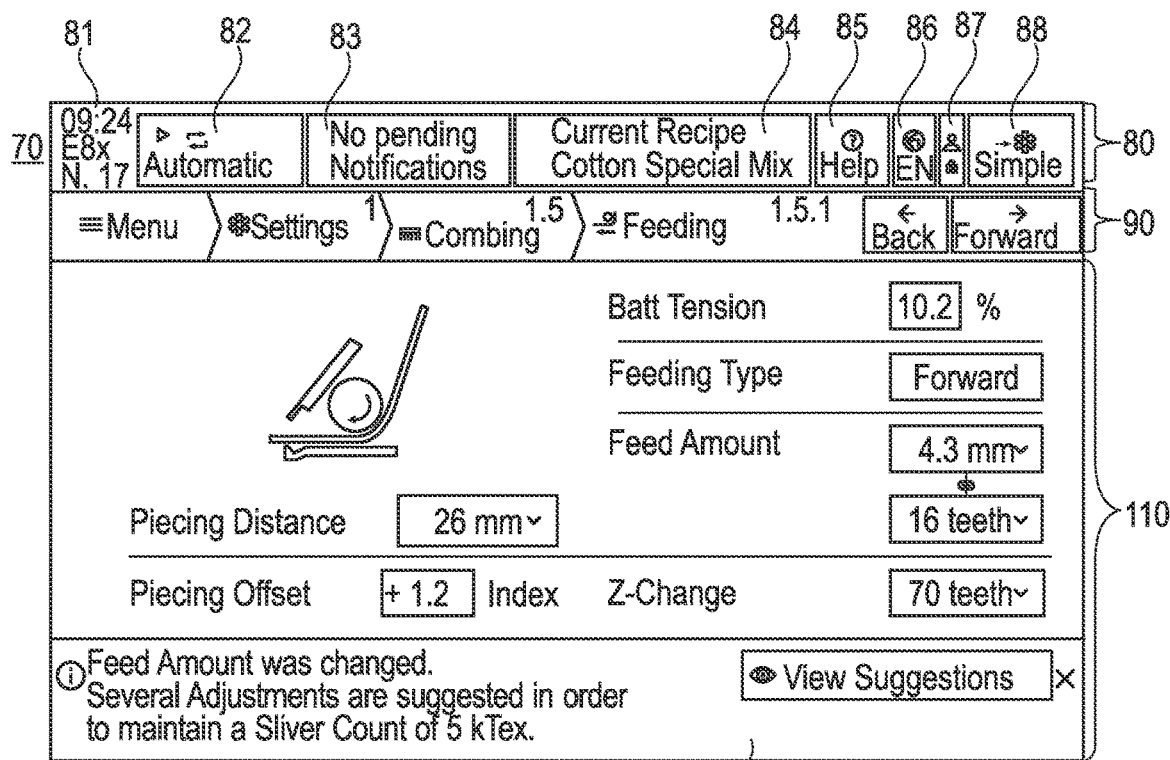
FIG. 16 shows a page for adjusting the parameters on the example of the combing machine after settings have been changed.

FIG. 16 shows a page for setting the parameters on the example of the combing machine after settings have been changed. A message 111 is displayed at the lower edge of the figure. The message 111 contains written information and suggested actions (e.g., "parameters have been changed"—"save"/"discard"). This message 111 is not modal, i.e., the user can still work normally on the screen while it is active.

Figures 17, 18:
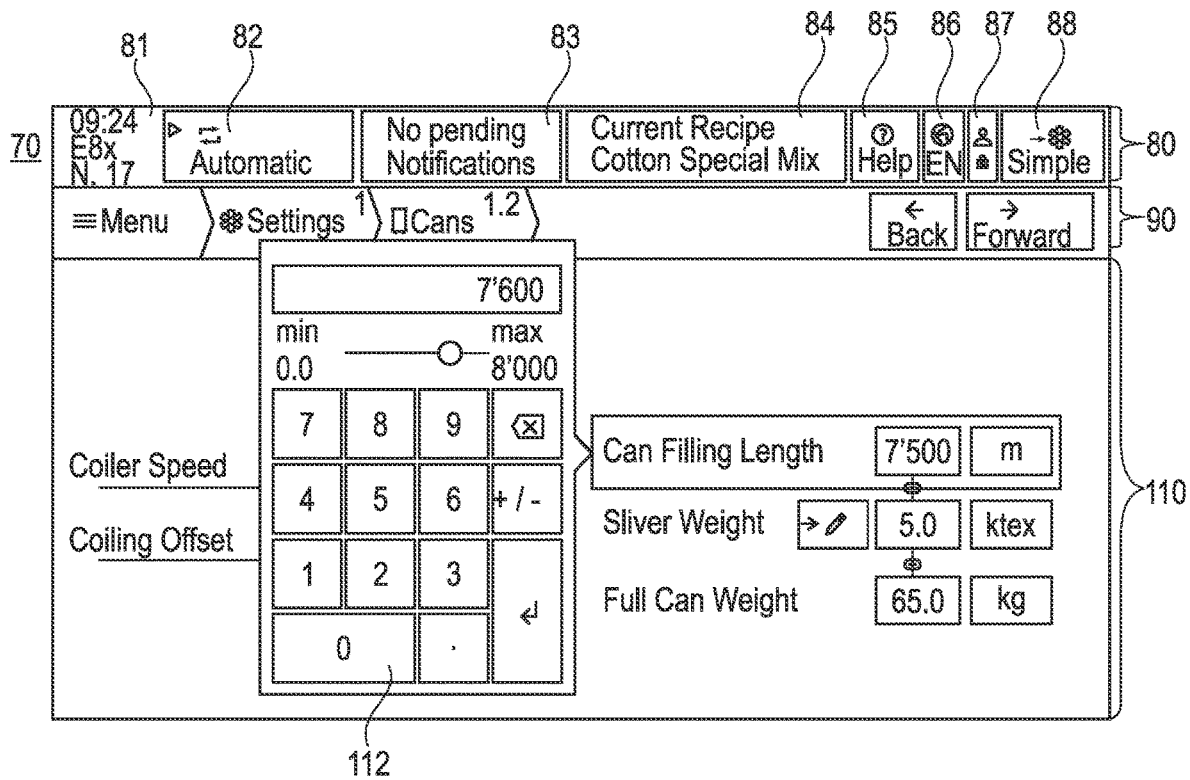
FIG. 17 shows a numeric block as an input field.
FIG. 18 shows a confirmation message after settings have been changed.

For example, FIG. 17 shows a numeric block 112 as an input field. The user input is made either via a screen keypad (alphanumeric input, not shown) or via the numerical block 112. The following options are possible here:
  When the user clicks on a numeric or alphanumeric input field 112, a superimposed screen is opened with the keypad or the digital block;
  With the numeric blocks 112, information is provided about the possible input field;
  With the keypad, the name of the parameter to be set is repeated as a caption, for example;
  The block of digits 112 can be closed either by clicking on "inner" (confirm) or by clocking on a different location on the screen (cancel);
  The keypad can be closed by clicking on either "enter" (confirm), by clicking on a "conceal keypad" (cancel) button or by clicking on another location on the screen (cancel);
  If the input value is not valid, the "confirm" function is not available, and the user is informed about the problem directly.

FIG. 18 shows an actuating message 113 after a change in settings. This status information is always used as an overlay whenever the user initiates an important process, the result of which cannot be visualized directly in context. Then feedback about the result of the process is given to the user (e.g., "recipe has been loaded"). Status overlays are placed over the content field and disappear automatically after a certain period of time or can be clicked manually by the user.

Figure 19:
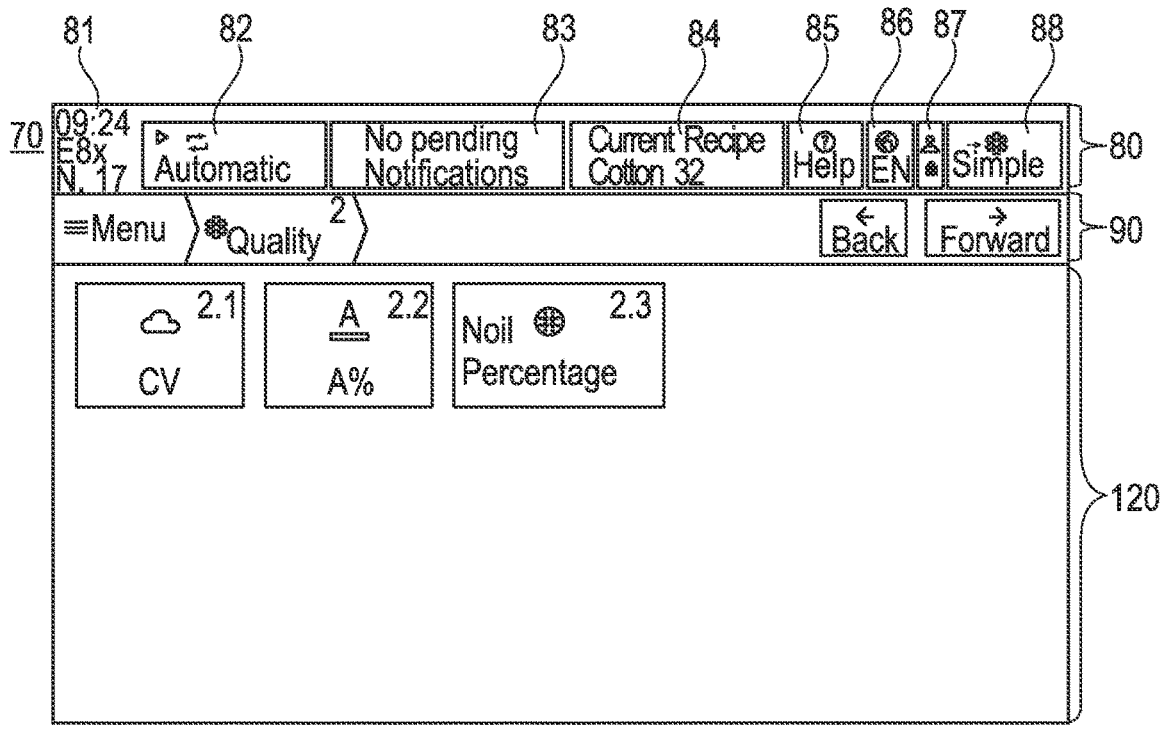
FIG. 19 shows an overview page on the quality of ongoing production.

FIG. 19 shows an overview page on the quality of ongoing production. This overview quality display 120 gives the user additional selection options. The "quality" section offers access to all quality-based settings, live data and progress data. It is structured in topics (e.g., "A %," "CV," etc.). The structure of the quality screens is largely standardized, and the content is machine specific.

Figure 20:
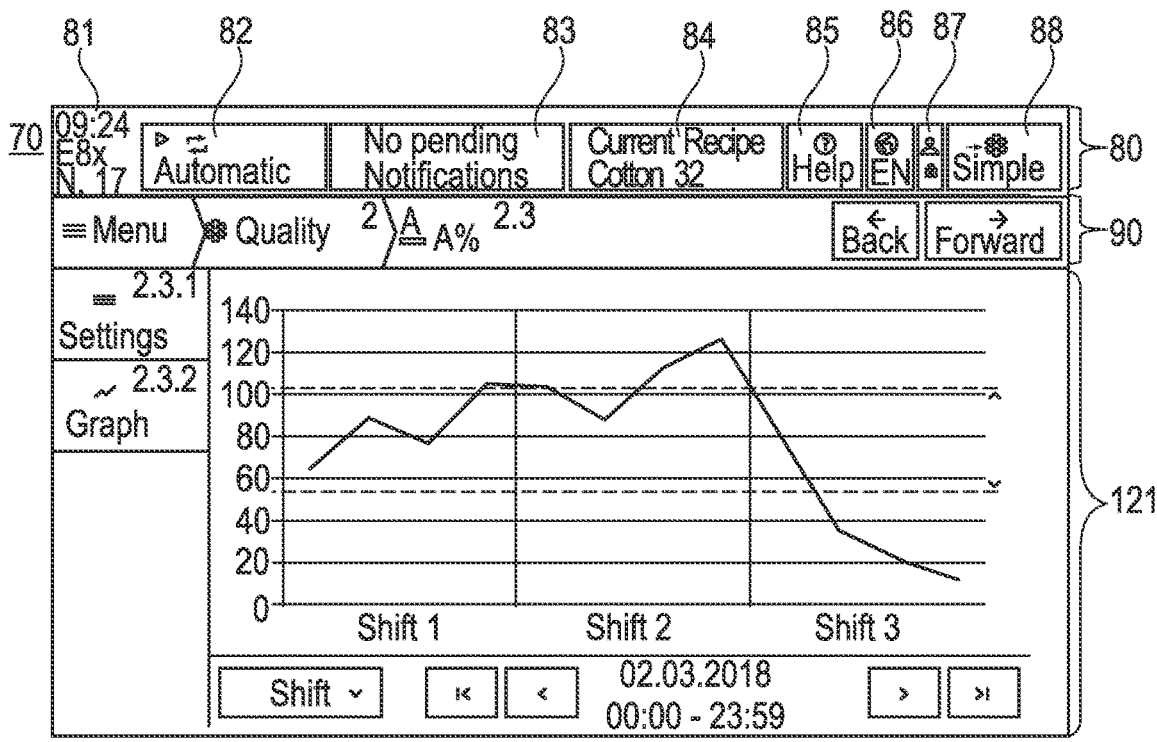
FIG. 20 shows a graphical display on the quality of ongoing production.

For example, FIG. 20 shows a graphical display 121 of the quality of ongoing production after being selected by the user in FIG. 19. The standard for quality subpages consists of having a subnavigation with at least the following register cards:
  Graph (diagram layout): historical vs. live data in graphical form;
  Settings (block layout): setting of target values and tolerances.

Figure 21:
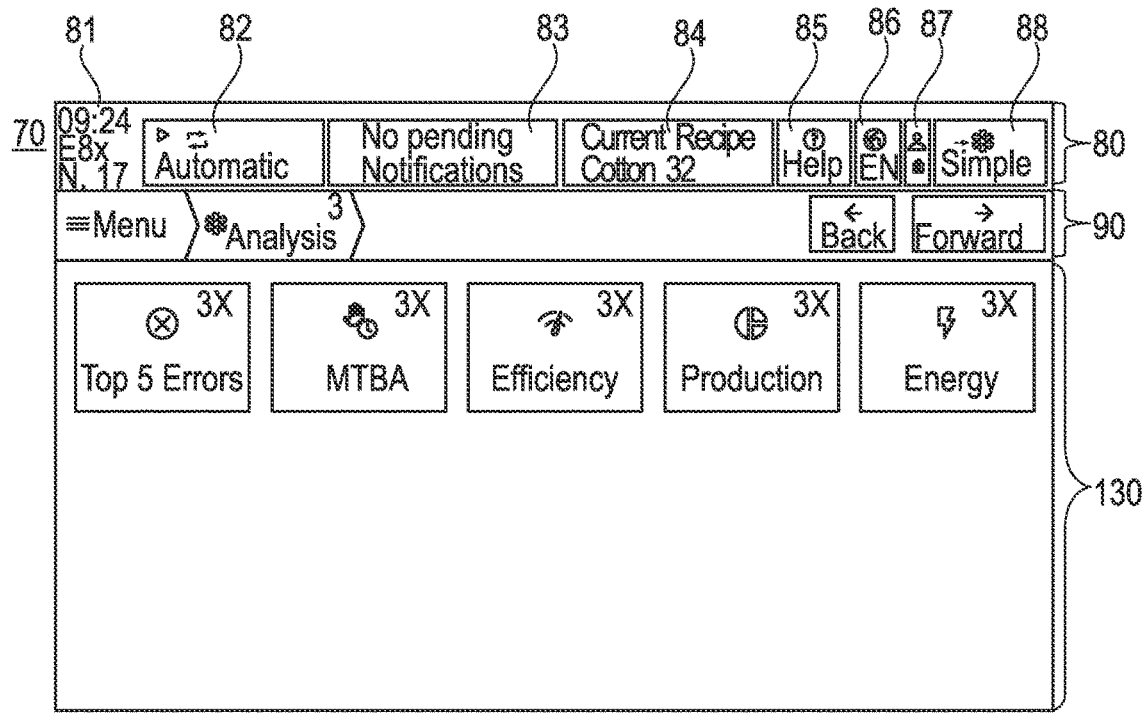
FIG. 21 shows an overview page on analysis of ongoing production.

FIG. 21 shows an overview page of analysis of ongoing production. The display 130 enables an overview by data analysis for the user to obtain information and to analyze various types of data and ongoing production and trends. It is structured according to topics (e.g., "efficiency," "energy"). The data analysis overview consists of tiles that allow access to various subtopics of the data analysis.

Figure 22:
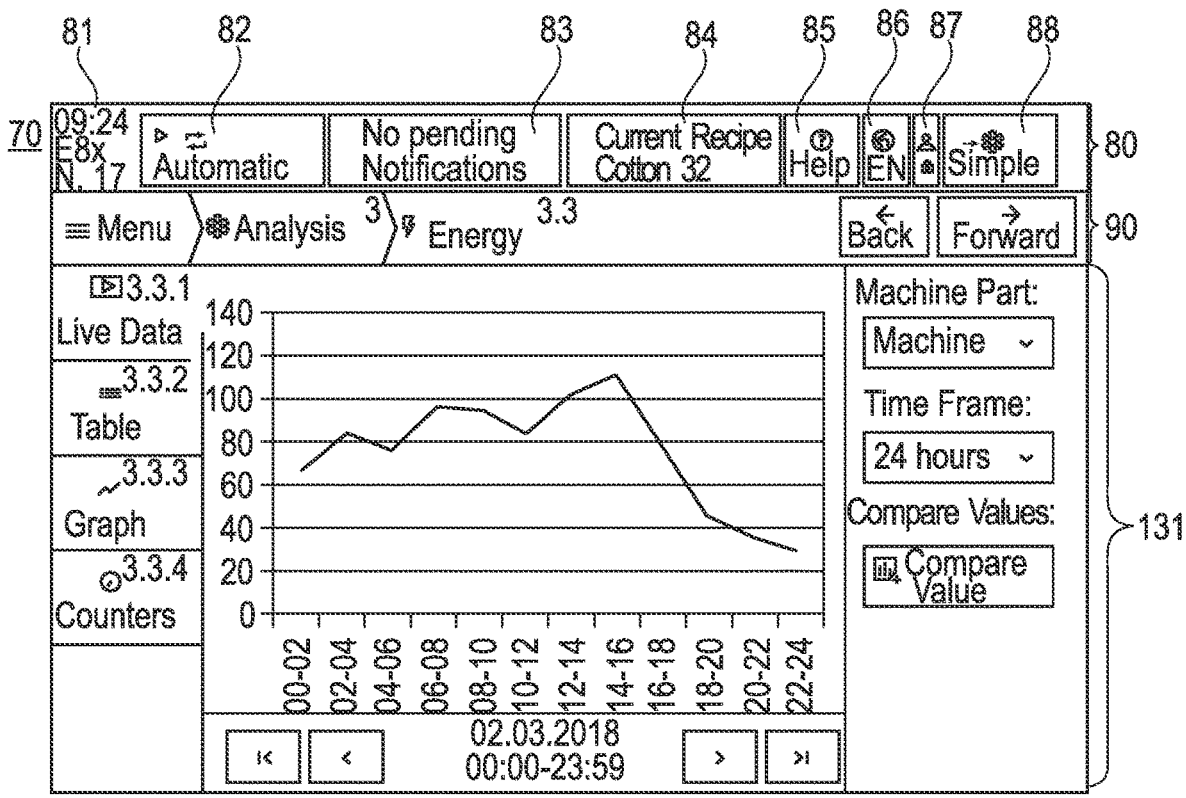
FIG. 22 shows a display on energy consumption of ongoing production.

FIG. 22 shows a display for energy consumption of the ongoing production. The data analysis display 131 shows a subnavigation with the following register cards as the standard for most subpages of the data analysis:

Live data (block layout): live data in numerical form;
Table (listen layout): historical data in tabular form;
Graph (diagram layout): historical vs. live data in graphical form with the possibility of comparing values;
Counter (block layout): possibility of setting/resetting certain counters.

Figure 23:
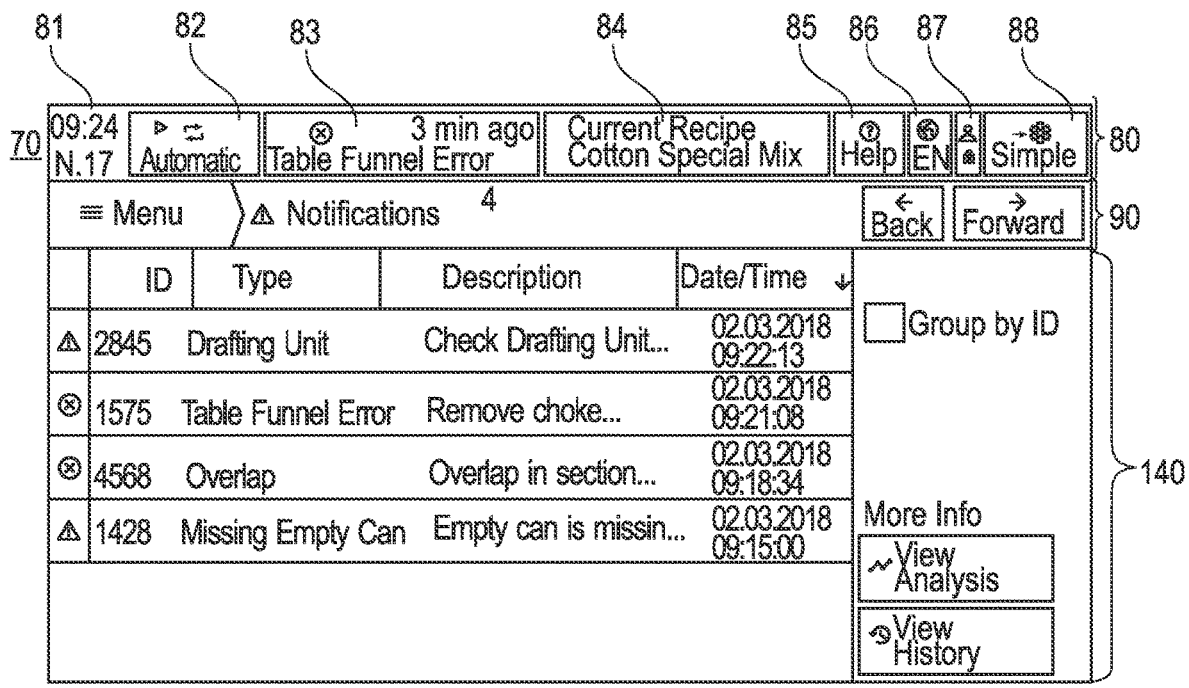
FIG. 23 shows a list of different messages.

FIG. 23 shows a list 140 of various messages. Notifications are messages sent by the system to the user and appear when a user interaction is required. There are three types of notifications:

Alarms: difficult problems that cause a machine shutdown;
Warnings: problems that can lead to an alarm is no action is being carried out;
Information: noncritical messages that inform the user about future intervention requirements.

The handling of notifications on the first main operating mask 10 as well on the second main operating mask 70 functions similarly with variations only on the detail level. Notifications can be handled by the following four elements:

In-context notification symbol (e.g., warning symbol on the machine model, cf. FIG. 4). Clicking on the symbol opens the notification detail as an overlay (cf. FIG. 5);
Notification button 83 in the second header 80 with the last or most important notification. Clicking on this field opens the notification list 140;
Notification list 140 containing all outstanding notifications requiring user interventions (i.e., alarm, warnings, service). Clicking on one of the notifications opens a notification detail as an overlay;
Notification detail as an overlay with detailed information about the notification (HTML—excerpt from the user manual about this type of notification) as well as possible solutions and direct access to the complete user manual.

Figure 24:
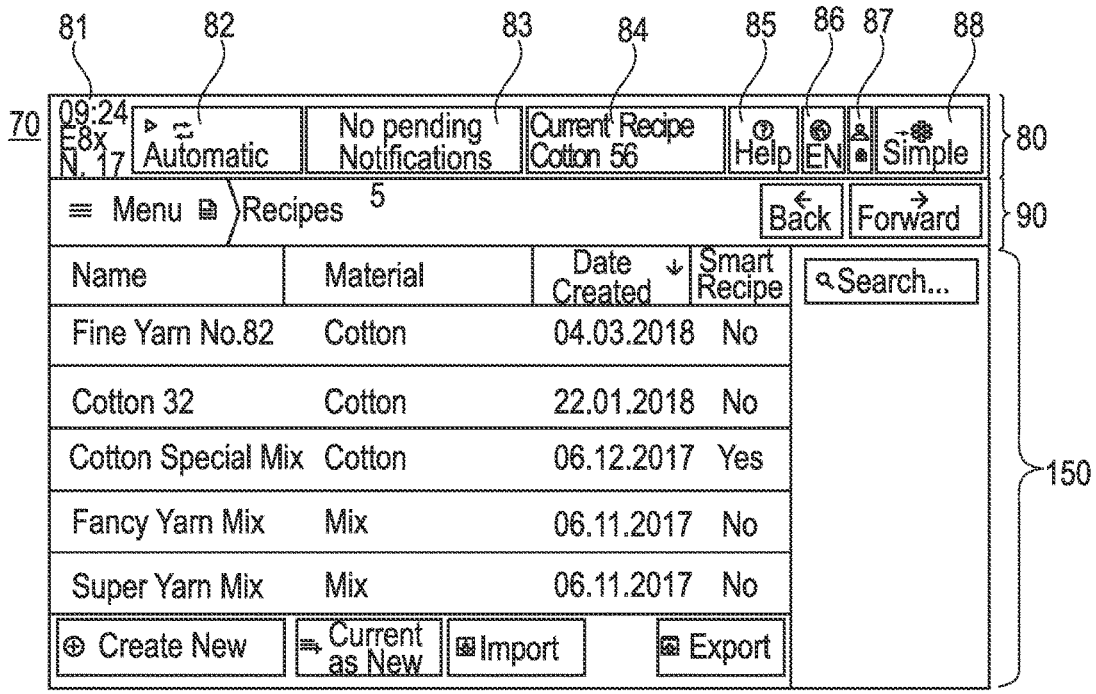
FIG. 24 shows a list of different recipes.

FIG. 24 shows a list 150 of various recipes. A recipe is a "setting template," which defines how an expected output product is obtained from a given input product with the tools/settings available on a certain machine (section). Recipes are therefore just a subset of all available machine settings, so the amount and type of information stored in a recipe is different from one machine to the next.

The recipe list 150 contains all the recipes stored in the device. A search field and filter options in the right part of the screen allow filtering of the list according to the user's needs. The list header allows sorting of the elements according to a certain column. The columns in the list are as follows:

Name of recipe
Date of creation of the recipe
Intelligent recipe yes/no
Material(s)

For machines with configurations that change frequently, an additional column may be added to indicate whether or not the recipe corresponds to the current configuration. Clicking on a recipe that does not conform to the current configuration causes a dialog field to appear to inform the user that the recipe cannot be loaded. However, the user can still view the details of the recipe if he would like to (in which case, irrelevant parameters are masked out).

A switch-field line in the recipe list below offers various general administration options (for example, "create new," "import," "export"). To display or process a recipe, the user must click directly on the corresponding line in the recipe list. This leads to FIG. 25.

Figures 25, 26:
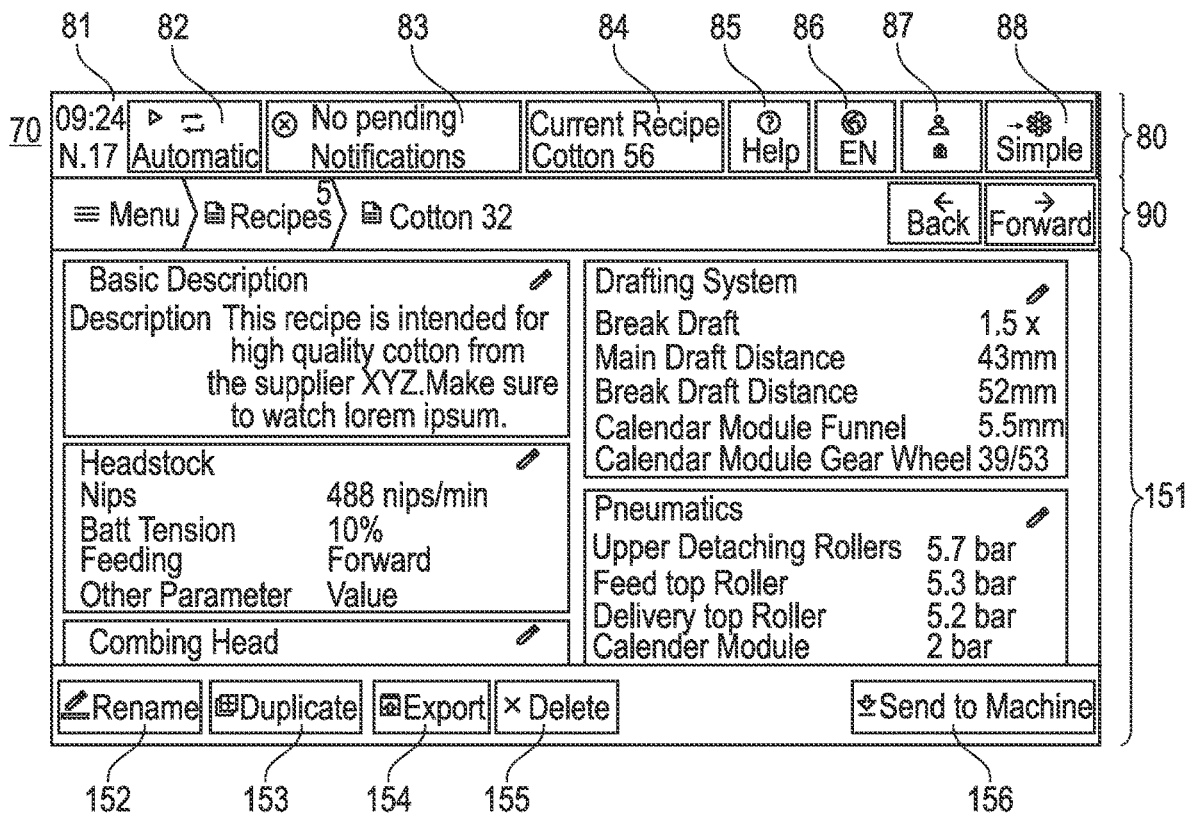
FIG. 25 shows a display of details of a special recipe.
FIG. 26 shows the editing of a special recipe.

To create a recipe, the user can begin with a standard recipe file or import an existing file or use a fast configuration assistant. The assistant will offer detailed suggested settings, based on selected target production parameters. The assistant contains the most important settings that are necessary for generating a good suggestion. After recipes have been created, they can be processed in a special processing mode, which is accessed via the recipe detail view (FIG. 25). To send a recipe to the machine (FIG. 27), the user must always go through the recipe detail view.

FIG. 25 shows a display 151 of details of a special recipe. The detail view shows the detailed values of the recipe in the form of information fields. A switch field strip at the lower edge of the screen offers additional actions which can relate to the recipe, for example, "rename" or "send to machine" (button 152 for renaming, button 153 for duplicating button 154 for exporting, button 155 for deleting, button 156 for sending to machine, etc.).

To process recipe parameters, a user can click on the corresponding fields to cause a dialog field 157 for processing parameters to open (cf. FIG. 26). If the user makes changes that can affect other parameters of the recipe, an additional dialog field with additional suggested changes will be displayed after clicking on "save changes."

FIG. 27 illustrates sending a recipe to the machine. The display 158 appears in sending the recipe to the machine to confirm that after the change, the recipe should be sent to the machine.

FIG. 28 shows the manual changing of a setting. The display 159 for manual adjustments gives the user an opportunity to make changes and to get access to instructions.

Figure 29:
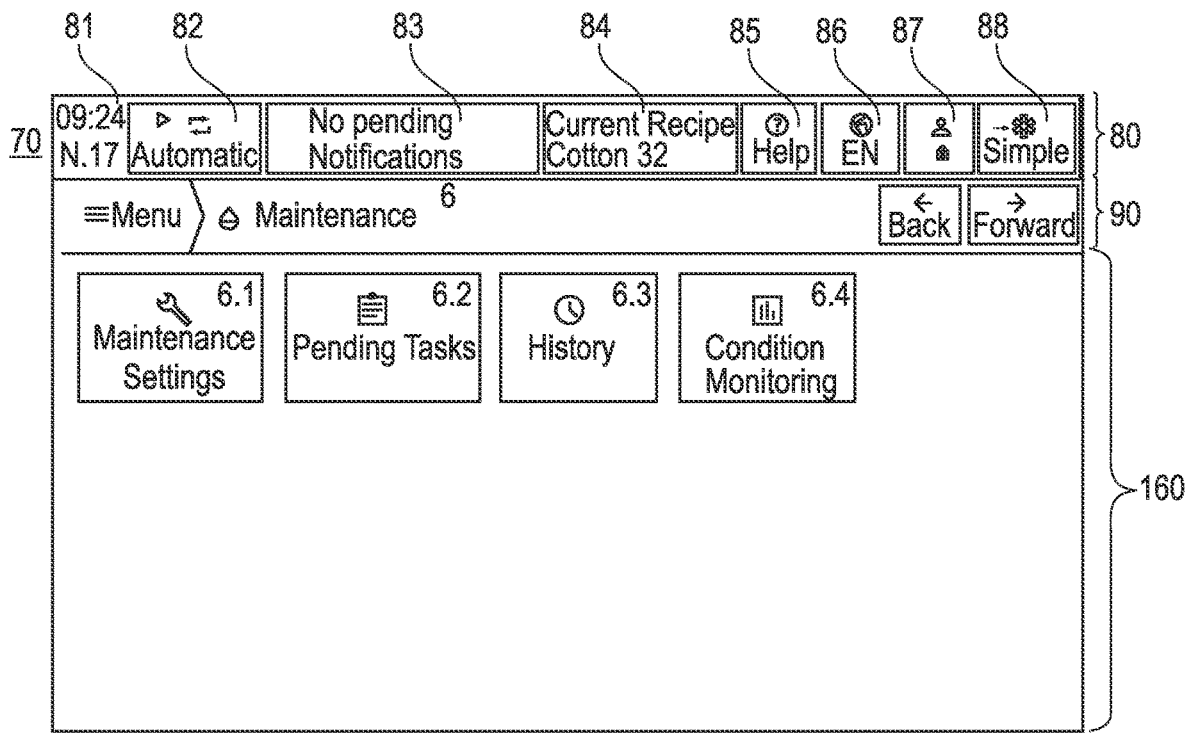
FIG. 29 shows an overview page for servicing the textile machine.
Figure 30:
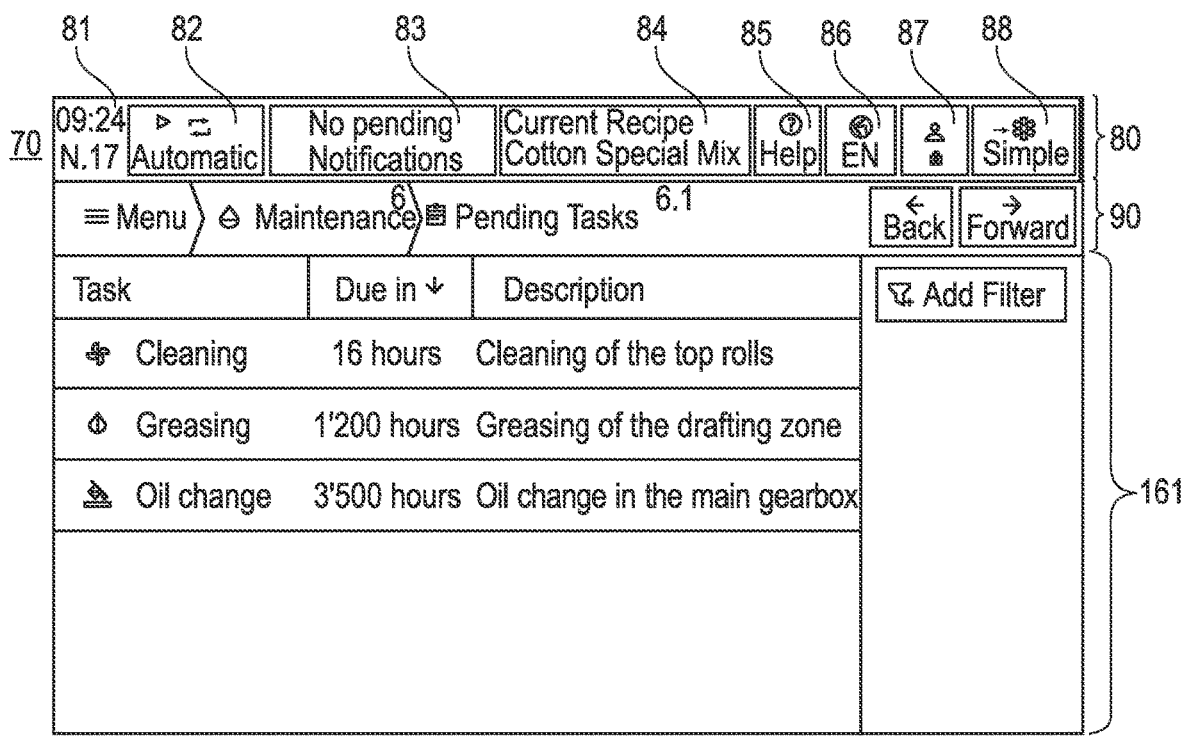
FIG. 30 shows a list of different messages on service.

FIG. 29 shows an overview page for service/maintenance on the textile machine. Maintenance intervals and their course can be established and checked on display 160 "maintenance overview." When the machine is connected, the maintenance settings can also be set by means of a higher-level maintenance system. The maintenance overview contains tiles which permit access to various subtopics:

Maintenance settings: possibility of activating, deactivating and setting maintenance intervals;
Outstanding jobs: list 161 of outstanding maintenance jobs with the remaining time (FIG. 30);
Course: course of all maintenance activities (log-file-extract);
Condition monitoring: possibility of seeing current status values and establishing limit values for status monitoring warnings.

Figure 31:
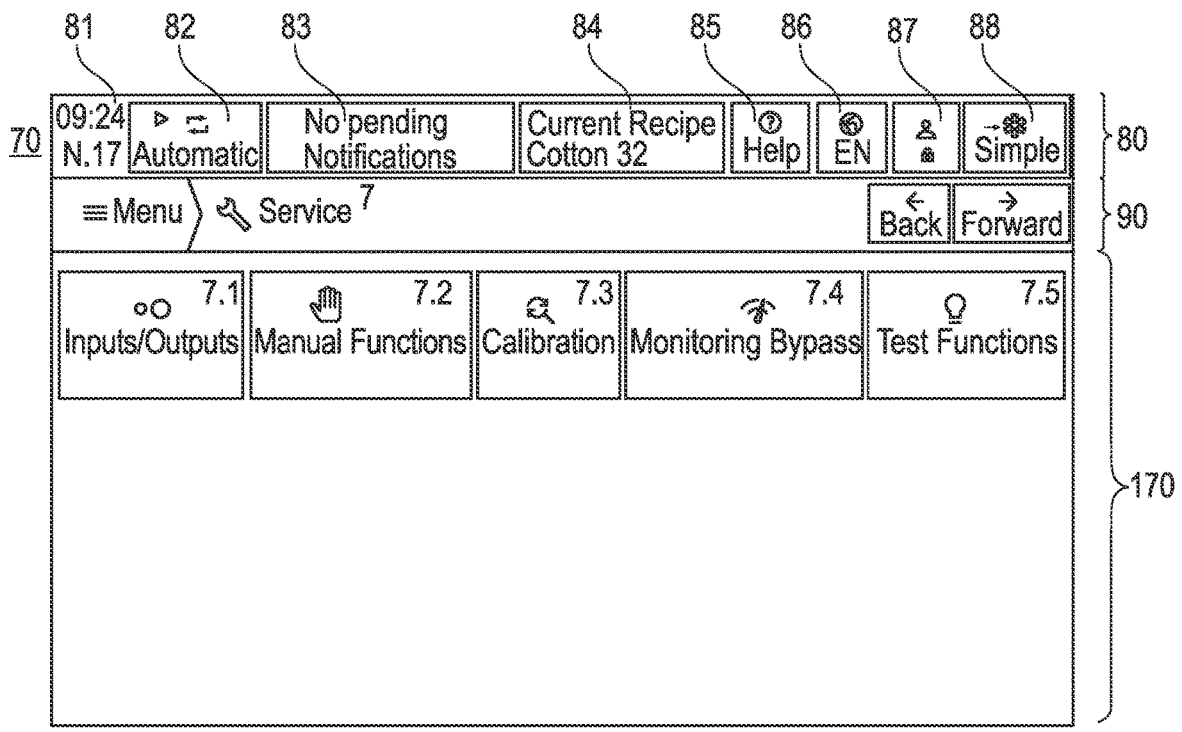
FIG. 31 shows an overview page for different services.

FIG. 31 shows an overview page for various services. The display 170 gives a service overview, which offers access to specialized start-up operation functions and trouble-shooting functions, which should be used only by a service technician. The service overview includes tiles that provide access to various subtopics:

Inputs/outputs: live view of the actual input/output states;
Manual functions: access to manual functions;
Calibration functions: access to calibration assistants;
Test functions: access to test functions.

Figure 32:
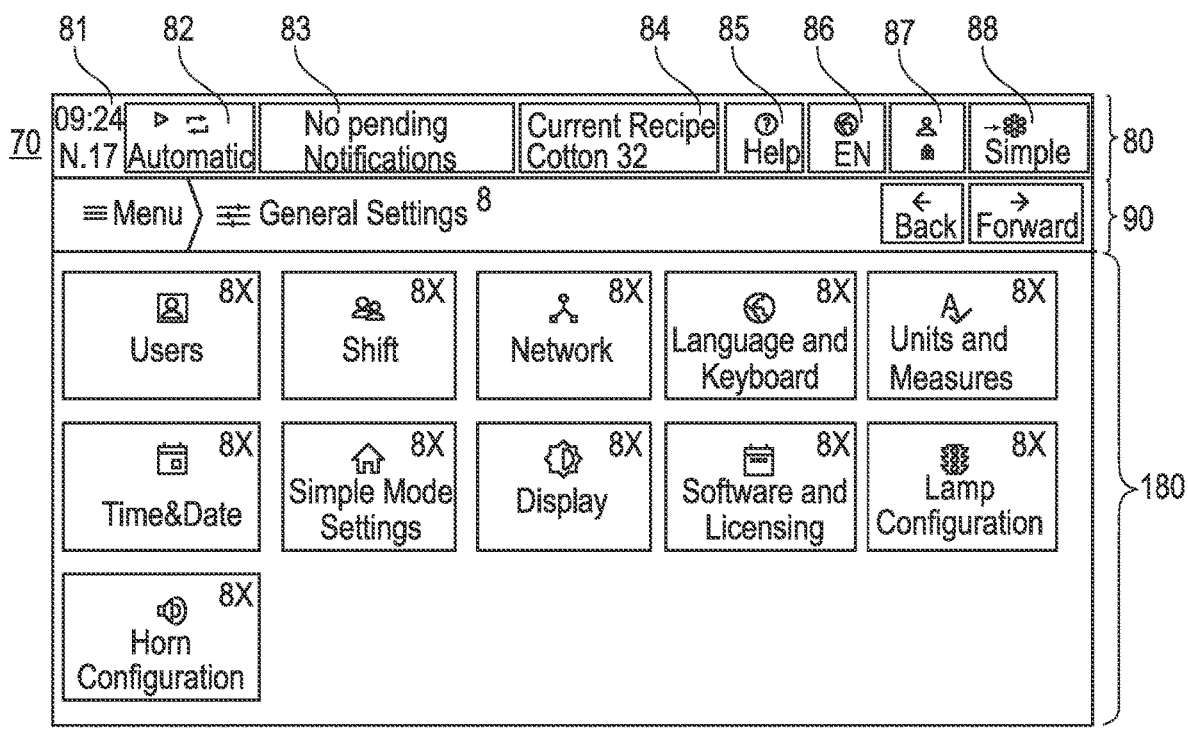
FIG. 32 shows an overview page for general settings.

FIG. 32 shows an overview page for general settings. The display 180 "overview of general settings" may contain settings for users, layers, network, language, etc.

Modifications and variations can be made to the embodiments illustrated or described herein without departing from the scope and spirit of the invention as set forth in the appended claims.

| REFERENCE NUMERALS | |
|---|---|
| 1 | ring spinning machine |
| 2 | spinning stations |
| 3₁ | head of ring spinning machine 1 |
| 3₂ | base of ring spinning machine 1 |
| 4 | roving bobbin |
| 5 | drawing stand |
| 6 | roving |
| 7 | cop |
| 8 | spindle |
| 9 | display and operating device |
| 10 | first main operating mask |
| 11 | first header |
| 12 | machine selection |
| 13 | mode |
| 14 | help button |
| 15 | language setting button |
| 16 | first authentication button |
| 17 | first toggle button (for switching to the second main operating mask) |
| 20 | notification field |
| 30 | display field for characteristic data of the machine |
| 31 | display |
| 32 | display |
| 33 | display |
| 34 | display |
| 40 | machine visualization field |
| 41 | simplified visualization of the textile machine |
| 42 | display of recipe |
| 43 | operating button |
| 44 | operating button |
| 45 | operating button |
| 46 | operating button |
| 47 | display |
| 48 | operating button |
| 49 | operating button |
| 50 | warning |
| 51 | display |
| 52 | title line of display 51 |
| 53 | operating button |
| 54 | operating button |
| 55 | operating button |
| 56 | title of alarm message |
| 57 | button for calling a service technician |
| 58 | button for display of notices |
| 59 | displays of the alarm in display 41 of the machine |
| 60 | list of notifications |
| 61 | alarm message |
| 62 | warning |
| 63 | reset button |
| 64 | display |
| 65 | display |
| 66 | display |
| 67 | operating button |
| 68 | operating button |
| 70 | second main operating mask |
| 80 | second header |
| 81 | machine selection |
| 82 | mode |
| 83 | notification button |
| 84 | recipe button |
| 85 | help button |
| 86 | language setting button |
| 87 | second authentication button |
| 88 | second toggle button (for switching to the first main operating mask) |
| 90 | navigation field |
| 100 | overview of submenus |
| 101 | setting overview |
| 102 | speed setting wizard |
| 103 | diagram of machine |
| 104 | button for setting overview |
| 105 | log-in mask |
| 110 | display of settings |
| 111 | message |
| 112 | numerical keypad |
| 113 | message |
| 120 | display of quality overview |
| 121 | quality display |
| 130 | display of data analysis overview |
| 131 | data analysis display |
| 140 | list of notifications |
| 150 | display of recipe overview |
| 151 | display of a specific recipe |
| 152 | button for renaming |
| 153 | button for duplicating |
| 154 | button for exporting |
| 155 | button for deleting |
| 156 | button for sending to machine |
| 157 | dialog field for changing settings |
| 158 | display of sending recipe to machine |
| 159 | display of manual adjustments |
| 160 | display of maintenance overview |
| 161 | display of pending jobs overview |
| 170 | display of service overview |
| 180 | display of general settings overview |
| x | longitudinal direction of ring spinning machine 1 |

The invention claimed is:

1. A display and operating device for a textile machine, comprising:
   a touchscreen that displays a first main operating mask and of a second main operating mask, the first and second main operating masks presenting a plurality of retrievable information masks and input masks for operating the textile machine;
   the first main operating mask comprises a machine visualization field that displays a simplified visualization of the textile machine and at least one shortcut operating button related to an operational task to be carried out by an operator on the textile machine;
   the first main operating mask further comprises a first toggle button by actuation of which the second main operating mask is accessed and presented; and
   the second main operating mask comprising a display of an overview of selectable submenus to set or change machine settings of the textile machine and to retrieve additional information related to the textile machine.

2. The display and operating device according to claim 1, wherein the first main operating mask comprises a first header that displays information and functions, and the second main operating mask comprises a second header that displays information and functions.

3. The display and operating device according to claim 2, wherein the first toggle button is presented in the first header.

4. The display and operating device according to claim 1, wherein the first toggle button is optically highlighted in comparison to remaining portions of the first main operating mask.

5. The display and operating device according to claim 1, wherein the second main operating mask comprises a second toggle button by actuation of which the first operating mask is accessed and presented.

6. The display and operating device according to claim 5, wherein the second main operating mask comprises a second header that displays information and functions and wherein the second toggle button is presented in the second header.

7. The display and operating device according to claim 1, wherein the display and operating device is configured such that only one of the first or the second main operating mask is displayed at a time.

8. The display and operating device according to claim 1, wherein the shortcut operating button is presented so as to be locally associated with a part of the simplified visualization of the textile machine or a machine part that is affected by the operating task to be carried out.

9. The display and operating device according to claim 1, wherein the first main operating mask comprises a notification field that displays notifications and a display field that displays characteristic data of the textile machine.

10. The display and operating device according to claim 1, wherein after actuation of the shortcut operating button further instructions for an operator are displayed on the first main operating mask related to the operating task to be carried out.

11. The display and operating device according to claim 1, wherein one or more of the shortcut operating buttons are provided for access to one or more of: handling material(s); shortcut access to functions; simple problem solving; simple cleaning of the machine; frequently repeated operating jobs on the machine; or setting, starting, or stopping production orders.

12. The display and operating device according to claim 1, wherein in an event of a disturbance in the textile machine, a corresponding message is displayed on the first main operating mask, and location of the disturbance is displayed on the simplified visualization of the textile machine.

13. The display and operating device according to claim 1, wherein the overview of submenus in the second main operating mask relate to one or more of:
   settings of the machine;
   quality-based information and settings;
   data analysis of ongoing production;
   notifications;
   recipes;
   services;
   maintenance;
   general settings;
   user manual;
   information and logs;
   backup; and
   data transfer.

14. The display and operating device according to claim 1, wherein the second main operating mask contains a second header and a navigation field.

15. The display and operating device according to claim 1, wherein the operator logs on with a username and password to one or both of the first and the second main operating mask.

16. The display and operating device according to claim 1, wherein a confirmation message appears as an overlay over the second main operating mask after settings in the textile machine have been changed.

17. The display and operating device according to claim 1, wherein the first and the second main operating mask are based on web technology.

18. The display and operating device according to claim 1, wherein the textile machine is a spinning preparation machine or an end spinning machine.

19. The display and operating device according to claim 1, wherein the display and operating device is one of: a mobile device; is mounted on the textile machine; or a stationary display device in which information is displayed in a web browser.

20. A textile machine, the textile machine comprising the display and operating device according to claim 1.

21. A system, comprising:
   a plurality of textile machines; and
   the display and operating device according to claim 1, wherein the display and operating device is configured for operation with the plurality of textile machines.

22. A method for operating the display and operating device according to claim 1, comprising:
   displaying the first main operating mask with the simplified visualization of the textile machine, the at least one shortcut operating button, and the first toggle button; and
   displaying the second operating mask when the first toggle button is actuated to allow the operator to change machine settings of the textile machine or to retrieve further information related to the textile machine.

23. The method according to claim 22, comprising displaying a second toggle button on the second operating mask by actuation of which displaying of the first operating mask is initiated and wherein a user is logged off from a logged-on state as soon as the second toggle button is actuated.

24. The method according to claim 22, wherein when the second main operating mask is displayed and after a predetermined time of user inactivity on the second main operating mask, the first main operating mask is displayed and a user is logged off from a logged-on state.

25. The method according to claim 22, comprising requiring a user to log on when making changes to machine settings in the second main operating mask.

* * * * *